US008584622B2

(12) United States Patent
Nishino

(10) Patent No.: US 8,584,622 B2
(45) Date of Patent: Nov. 19, 2013

(54) SAFETY BELT FOR RIDING DOUBLE ON TWO-WHEELED VEHICLE

(76) Inventor: Sadaaki Nishino, Nishitokyo (JP)

( * ) Notice: Subject to any disclaimer, the term of this patent is extended or adjusted under 35 U.S.C. 154(b) by 124 days.

(21) Appl. No.: 13/383,272

(22) PCT Filed: Feb. 12, 2010

(86) PCT No.: PCT/JP2010/000860
§ 371 (c)(1),
(2), (4) Date: Jan. 10, 2012

(87) PCT Pub. No.: WO2011/007465
PCT Pub. Date: Jan. 20, 2011

(65) Prior Publication Data
US 2012/0112444 A1 May 10, 2012

(30) Foreign Application Priority Data
Jul. 14, 2009 (JP) .................................. 2009-165508

(51) Int. Cl.
A62B 35/00 (2006.01)
(52) U.S. Cl.
USPC .......................................... 119/770; 119/857
(58) Field of Classification Search
USPC .............. 119/770, 769, 771, 857; 244/151 R; 280/202
See application file for complete search history.

(56) References Cited

U.S. PATENT DOCUMENTS

| 4,560,097 | A |   | 12/1985 | Reynolds et al. |        |
|-----------|---|---|---------|-----------------|--------|
| 4,746,084 | A | * | 5/1988  | Strong          | 244/151 R |
| 4,759,311 | A | * | 7/1988  | Boyle           | 119/857 |
| 5,076,598 | A | * | 12/1991 | Nauman          | 280/202 |
| 5,152,013 | A |   | 10/1992 | Johnson         |        |
| 5,183,007 | A | * | 2/1993  | Vincent         | 119/770 |

(Continued)

FOREIGN PATENT DOCUMENTS

| JP | 60-175786 U | 11/1985 |
| JP | 63-11261 U | 1/1988 |
| JP | 2006-8030 A | 1/2006 |
| JP | 3119894 U | 1/2006 |
| JP | 2006-289004 A | 10/2006 |
| JP | 2007-001502 A | 1/2007 |

OTHER PUBLICATIONS

International Search Report dated May 25, 2010 issued in International Appln. No. PCT/JP2010/000860.
Child Riding Belts Information web page accessed on Dec. 2, 2011 at www.childridingbelt.com/engprod.
Riderz Ragz web page accesssed on Dec. 2, 2011 at www.riderzragz.com.
Extended European Search Report (in English) dated Feb. 4, 2013, which issued in counterpart European Application No. 10799529.2-2425/2455280.

Primary Examiner — Yvonne Abbott
(74) Attorney, Agent, or Firm — Holtz, Holtz, Goodman & Chick, PC

(57) ABSTRACT

A safety belt of the present invention includes a first backing member attached to the back of the driver, a first waist belt attached around the waist of the driver, a pair of first shoulder belts attached around the shoulders of the driver, a second waist belt attached around the waist of the passenger, a pair of second shoulder belts attached around the shoulders of the passenger, a plurality of waist belt attaching portions enabling attachment of the second waist belt to the first backing member in a freely detachable manner, and a plurality of shoulder belt attaching members enabling attachment of respective portions of the second shoulder belts located at a front side of the passenger to the first backing member. An attachment position of the second waist belt and attachment positions of the second shoulder belts to the first backing member are selectable accordingly among the plurality of waist belt attaching portions and the plurality of shoulder belt attaching members.

13 Claims, 22 Drawing Sheets

(56) References Cited

U.S. PATENT DOCUMENTS

| | | | |
|---|---|---|---|
| 5,190,306 A * | 3/1993 | Nauman et al. | 280/202 |
| 5,692,456 A * | 12/1997 | Louks-Phillips | 119/770 |
| 6,325,023 B1 * | 12/2001 | Elnatan | 119/770 |
| 6,651,594 B1 * | 11/2003 | Bagwell | 119/770 |
| 7,017,525 B2 * | 3/2006 | Leach | 119/770 |
| 7,997,536 B2 * | 8/2011 | Fradet | 244/151 R |
| 2004/0225243 A1 | 11/2004 | Leach | |
| 2006/0254533 A1 | 11/2006 | Fuller et al. | |

\* cited by examiner

SAFETY BELT FOR RIDING DOUBLE ON TWO-WHEELED VEHICLE

This application is a U.S. National Phase Application under 35 USC 371 of International Application PCT/JP2010/000860 filed Feb. 12, 2010.

TECHNICAL FIELD

The present invention relates to a safety belt for tandem riding on a two-wheeled vehicle.

BACKGROUND ART

When a passenger rides on the rear seat of a two-wheeled vehicle, the passenger puts both arms around the body of a driver, or holds a device, such as a holding belt provided between the driver's seat and the rear seat or a holding grip provided at the side or the back of the rear seat to ride on the vehicle, thereby maintaining the stability of the riding posture and preventing the passenger from falling from the two-wheeled vehicle at the time of starting and running a curved road. Moreover, like the belt with a grip for tandem riding on a two-wheeled vehicle disclosed in following patent document 1, a driver attaches a device in a belt shape around the body of the driver, and a passenger holds the holding grips provided at both ends of the belt, thereby maintaining the stability of the riding posture and preventing the passenger from falling from the two-wheeled vehicle.

However, such devices like the holding belt and the holding grip attempt to maintain the stability of the riding posture based on the gripping power of the passenger. Hence, it is difficult for women and children with a weak grip power to support the upper part of the body for a long time using the holding belt and the holding grip. Moreover, a function of suppressing a falling of the passenger from the two-wheeled vehicle is not ensured when the passenger falls asleep or releases the hand from the holding belt and the holding grip.

Following patent document 2 discloses a falling prevention device which maintains the stability of the riding posture of the passenger not by only the gripping power of the passenger riding on the rear seat of a two-wheeled vehicle. This device employs a configuration in which the driver and the passenger are coupled together through a double-structure waist belt, thereby maintaining the stability of the riding posture of the passenger. However, the stability of the riding posture of the upper part of the passenger from the waist needs to be supported by holding a holding belt or a holding grip, etc. Hence, when, in practice, the passenger fails to hold the holding belt, the holding grip, etc., by gripping power due to, for example, catnap, no structure is employed which maintains the stability of the riding posture of the upper part from the waist, and it is unavoidable that the passenger largely bends the body backwardly or tilts the body from side to side.

A safety belt device for tandem riding on a two-wheeled vehicle typical of a scheme disclosed in patent document 3 prevents the passenger from falling from the two-wheeled vehicle while maintaining the stability of the riding posture of not only the waist of the passenger riding on the rear seat of the two-wheeled vehicle but also the whole upper part of the body. This device includes a waist belt fastening respective waists of the driver and the passenger so as to tie both waists together, and a pair of shoulder belts fastening respective shoulders of the driver and the passenger tied together. According to such a device, the stability of the riding posture of the upper part of the passenger from the waist can be maintained without depending on only the gripping power of the passenger, thereby preventing the passenger from falling from the two-wheeled vehicle.

According to such a device, however, when the difference in physical size between the driver and the passenger is large and the seating position for the driver and the seating position for the passenger have the same height, as shown in FIG. 21, the device cannot be surely attached to the shoulder of the passenger, and the upper body of the passenger may be released from the device due to a rolling when the two-wheeled vehicle is running Moreover, according to such a device, when the difference in physical size between the driver and the passenger is substantially zero or when the physical size of the passenger is larger than that of the driver and when the seating position for the passenger is higher than the seating position for the driver, as shown in FIG. 22, the shoulder belt interferes with the neck of the driver, which may disturb the driving.

PRIOR ART DOCUMENT

Patent Document

Patent Document 1: JP S63-11261 A
Patent Document 2: JP 2006-8030 A
Patent Document 3: Japanese Utility Model No. 3119894 Publication

DISCLOSURE OF INVENTION

Problem to be Solved by the Invention

The safety belt devices for tandem riding on a two-wheeled vehicle described above are not a solution for preventing the passenger from falling from a two-wheeled vehicle by ensuring the stability of the riding posture of the upper part of the passenger without depending on only the gripping power of the passenger while addressing the difference in physical size between the driver and the passenger and the difference in height between the seating position for the driver and that for the passenger.

For example, according to the safety belt device for tandem riding on a two-wheeled vehicle disclosed in patent document 3, when the driver is tall and the passenger is short like an infant child or a child, and the difference in height between the seating position for the driver and the seating position for the passenger is substantially zero (see FIG. 21), the upper part of the passenger is highly possibly released from the safety belt device. Moreover, when the driver is short and the passenger is tall, and the seating position for the driver is lower than the seating position for the passenger (see FIG. 22), the safety belt device may be trapped by the neck or the side of the head of the driver, and the motion of the passenger disturbs the driving.

The present invention is to address the technical issues of the above-explained safety belt devices. That is, it is an object of the present invention to provide a safety belt which overcomes the above-explained technical issues associated with the difference in physical size between a driver and a passenger and the difference in height between a seating position for the driver and a seating position for the passenger while satisfying a necessity of ensuring the stability of the riding posture of the upper part of the passenger without depending on the gripping power of the passenger, prevents the passenger from falling from a two-wheeled vehicle without being affected by the difference in physical size between the driver and the passenger and the difference in height between the seating position for the driver and the seating position for the passenger, and can be safely used for all people.

Means for Solving the Problem

To achieve the object, a safety belt according to an aspect of the present invention is for coupling respective upper body parts of a driver of a two-wheeled vehicle and a passenger thereof, and includes: a first backing member attached to a back of the driver; a first waist belt coupled to a lower part of the first backing member and attached around a waist of the driver; a pair of first shoulder belts coupled to an upper part of the first backing member and attached around shoulders of the driver; a second waist belt attached around a waist of the passenger; a pair of second shoulder belts attached around shoulders of the passenger; a plurality of waist belt attaching portions provided on the first backing member separately from one another in a vertical direction, the plurality of waist belt attaching portions enabling attachment of the second waist belt to the first backing member in a freely detachable manner; and a plurality of shoulder belt attaching members provided on the first backing member separately from one another in the vertical direction, the plurality of shoulder belt attaching members enabling attachment of respective portions of the second shoulder belts located at a front side of the passenger to the first backing member, in which an attachment position of the second waist belt and attachment positions of the second shoulder belts to the first backing member are selectable accordingly among the plurality of waist belt attaching portions and the plurality of shoulder belt attaching members.

A safety belt according to another aspect of the present invention is for coupling respective upper body parts of a driver of a two-wheeled vehicle and a passenger thereof, and includes: a tabular first backing member attached to a back of the driver; a first waist belt coupled to a lower part of the first backing member and attached around a waist of the driver; a pair of first shoulder belts coupled to an upper part of the first backing member and attached around shoulders of the driver; a second waist belt attached around a waist of the passenger and having front portions located at the driver side detachably inserted in a width direction of the first backing member in a waist belt attaching portion provided on the first backing member or caught by the waist belt attaching portion in a manner spaced apart from each other at a predetermined clearance in the width direction of the first backing member; a pair of second shoulder belts attached around shoulders of the passenger and having respective front portions located at a driver side detachably attached to a shoulder belt attaching member provided on the first backing member in a manner spaced apart from each other at a predetermined clearance in the width direction of the first backing member at a location above the position of the waist belt attaching portion, in which a plurality of waist belt attaching portions are provided on the first backing member in a manner spaced apart from one another in a vertical direction, and a plurality of shoulder belt attaching members are provided on the first backing member in a manner spaced apart from each other in the vertical direction, and an attachment position of the second waist belt and attachment positions of the second shoulder belts are selectable accordingly among the plurality of waist belt attaching portions and the plurality of shoulder belt attaching members.

A safety belt according to the other aspect of the present invention is for coupling respective upper body parts of a driver of a two-wheeled vehicle and a passenger thereof, and includes: a tabular first backing member attached to a back of the driver; a first waist belt coupled to a lower part of the first backing member and attached around a waist of the driver; a pair of first shoulder belts coupled to an upper part of the first backing member and attached around shoulders of the driver; a second waist belt attached around a waist of the passenger and having front portions located at a driver side detachably inserted in a width direction of the first backing member in a waist belt attaching portion provided on the first backing member or caught by the waist belt attaching portion in a manner spaced apart from each other at a predetermined clearance in the width direction of the first backing member; second shoulder belts including a pair of belts coupled together to form a loop around shoulders of the passenger to a front of a chest of the passenger, and having a front portion located at the driver side over a coupled portion of the pair of belts detachably attached to a shoulder belt attaching member provided on the first backing member at a location above the waist belt attaching portion, in which a plurality of waist belt attaching portions are provided on the first backing member in a manner spaced apart from one another in a vertical direction, and a plurality of shoulder belt attaching members are provided on the first backing member in a manner spaced apart from each other in the vertical direction, and an attachment position of the second waist belt and attachment positions of the second shoulder belts are selectable accordingly among the plurality of waist belt attaching portions and the plurality of shoulder belt attaching members.

The above-explained safety belt further includes a tabular second backing member attached to a back of the passenger, in which the second waist belt is coupled to a lower part of the second backing member and the second shoulder belts are coupled to an upper part of the second backing member.

The above-explained safety belt further includes a backing belt fixed to a back face of the first backing member and running along a vertical direction of the first backing member, in which the plurality of waist belt attaching portions are provided on the backing belt spaced apart in the vertical direction each passing through in a width direction of the backing belt, and the plurality of shoulder belt attaching members are provided on the backing belt spaced apart in the vertical direction each passing through in a vertical direction of the backing belt.

According to the above-explained safety belt, the backing belt includes a plurality of portions stitched to the first backing member in the width direction and spaced apart in the vertical direction, the shoulder belt attaching member comprises an annular member inserted and fastened in the width direction of the backing belt at an annular portion located at a space between the adjoining stitched portions of the backing belt in the vertical direction, and the waist belt attaching portion comprises an annular portion in the width direction of the backing belt located between the adjoining shoulder belt attaching members spaced apart from one another in the vertical direction and between the stitched portions spaced apart in the vertical direction.

The above-explained safety belt further includes a pull member which has one end coupled to the second shoulder belt, has another end running toward a front side of the driver along the first shoulder belt, and has a predetermined length, in which the second shoulder belt can be pulled by pulling the other end of the pull member toward the front side of the driver.

A safety belt according to the further other aspect of the present invention is for coupling respective upper body parts of a driver of a two-wheeled vehicle and a passenger thereof, and includes: a first backing member attached to a back of the driver; a first waist belt coupled to a lower part of the first backing member and attached around a waist of the driver; a pair of first shoulder belts coupled to an upper part of the first backing member and attached around shoulders of the driver; a second backing member attached to a back of the passenger; a second waist belt coupled to a lower part of the second backing member, attached around a waist of the passenger, and having front portions located at a driver side inserted in a width direction of the first backing member in a waist belt attaching portion provided on the first backing member or caught by the waist belt attaching portion in a manner spaced apart from each other at a predetermined clearance in the width direction of the first backing member; and a second shoulder belt coupled to an upper part of the second backing member, attached around shoulders of the passenger and having a front portion located at the driver side attached to a shoulder belt attaching member provided on the first backing member at a location above the position of the waist belt attaching portion.

Effect of the Invention

According to the safety belt of the above-explained structure, the first backing member to be attached to the back of the driver has the plurality of waist belt attaching portions and the plurality of shoulder belt attaching members spaced apart from one another in the vertical direction, and respective attaching portion and member are selected as needed among the plurality of attaching portions and members to attach the second waist belt and the second shoulder belts of the passenger. Hence, even when there is a difference in physical size between the driver and the passenger and when there is a difference in height between the seating position for the driver of the two-wheeled vehicle and the seating position for the passenger, it is possible to provide the safety belt for riding double on a two-wheeled vehicle which can maintain the stability of the riding posture of the passenger and which can prevent the passenger from falling without being affected by such differences.

In particular, the waist belt attaching portions and the shoulder belt attaching members are provided on the tabular first backing member which is stable and is attached to the back of the driver, the passenger and the driver are united together, and thus effects of ensuring the good stability of the passenger and preventing the passenger from falling can be obtained.

Moreover, when the tabular second backing member is additionally provided for the back of the passenger, it further contributes to the stability of the posture of the passenger. When the pair of the first shoulder belts of the driver are extended and fastened to the back face of the first backing member of the driver along the vertical direction, and when the waist belt attaching portions and the shoulder belt attaching members are respectively provided on such a back face, respective attaching portions and members can have sufficient strengths, and thus the safety is further ensured.

Furthermore, when the backing belt is formed by, for example, double belt members, and partially stitched to the first backing member, and when the shoulder belt attaching members and the waist belt attaching portions are formed in an annular shape using the space between the stitched portions, the safety belt with a simplified structure can be provided.

Still further, when each waist belt and shoulder belt is provided with a belt adjuster for adjusting the length, and when the waist belt is configured to be freely attachable and detachable through belt buckles, the safety belt can be provided which facilitates adjustment of the length of the belt and which is easy to use because of the easy attachment and detachment thereof.

Yet further, according to the present invention, the tabular first backing member to be stably attached to the back of the driver and the tabular second backing member to be stably attached to the back of the passenger are coupled together through the second waist belt and the second shoulder belts, which stably maintain the posture of the passenger.

BEST MODE FOR CARRYING OUT THE INVENTION

Embodiments of the present invention will be explained with reference to the accompanying drawings.

Embodiments

First, an explanation will be given of a general outline of an embodiment of the present invention with reference to FIG. 1.

Figure 1:
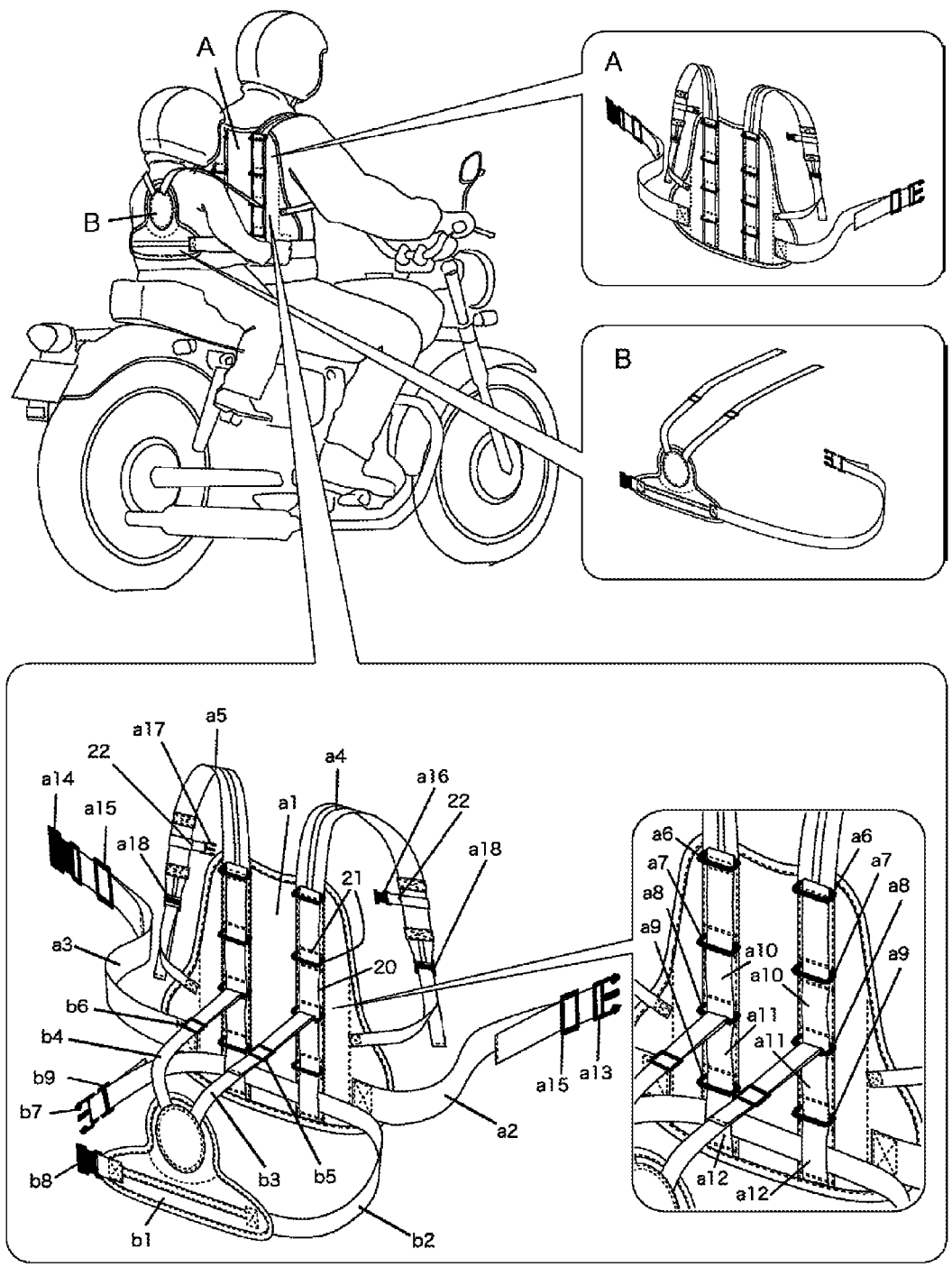
FIG. 1 is a diagram showing how a driver and a passenger wearing a safety belt of the present invention ride on a two-wheeled vehicle and is a perspective view showing a structure of the safety belt according to a first embodiment.

FIG. 1 is a diagram showing how a driver and a passenger wearing a safety belt of the present invention ride on a two-wheeled vehicle, and is a perspective view showing the safety belt of the present invention. As shown in this figure, the safety belt of the present invention employs a combination of two structural components: a driver wearing component (A); and a passenger wearing component (B). The two structural components which are the driver wearing component (A) and the passenger wearing component (B) are coupled together in advance to use the safety belt.

As shown in the perspective view of FIG. 1, the driver wearing component (A) includes a tabular first backing member (a1) that is the basal component. The first backing member (a1) is formed of, for example, a plurality of cloths stitched together in a flexible manner, has a planar shape that covers all or a part of the back of a driver, and has a bottom part with a width increasing so as to cover a part of the flank of the driver. The first backing member may be formed of, for example, leather or a resin, and a thick cloth may be used instead. The material of the first backing member (a1) is not limited to the above-explained examples, and the shape thereof is not limited to the above-explained shape.

The first backing member (a1) includes a pair of first waist belts (a2 and a3) which have respective ends stitched to lower both ends of the first backing member (a1). Respective another ends of the pair of first waist belts (a2 and a3) are attached with the first waist belt buckles (a13 and a14) and a first waist belt adjuster (a15) in a freely detachable manner. The first waist belts (a2 and a3) are formed of thick and heavy-duty cloth bands widely used for, for example, a backpack. The adjuster (a15) and the buckles (a13 and a14) are ones formed of a resin and likewise widely used for a backpack. The materials of those components are not limited to the above-explained examples.

The first backing member (a1) also has first shoulder belts (a4 and a5) which extend from both ends of the first backing member (a1) in the width direction with respect to the center line thereof, are parallel to each other and have a predetermined width. More specifically, both ends of the band-like first shoulder belts with a predetermined width are stitched to the first backing member (a1).

According to this example, backing belts (20) are stitched so as to overlap the first shoulder belts (a4 and a5), respectively, and other cloth belts having a slightly narrower width than the first shoulder belts (a4 and a5) are partially stitched on respective backing belts in a superimposed manner. More specifically, each of the first shoulder belts (a4 and a5) and the other cloth belt superimposed thereon have a pair of stitched portions (21) along the width direction of the pair of first shoulder belts and adjoining to each other in the vertical direction of the first backing member (a1). According to the example shown in FIG. 1, pairs of the stitched portions (21) are formed at four locations from the upper end of the first backing member (a1) and the lowermost end of the first shoulder belt is also stitched in the width direction. A pass-through part with a narrow width is formed in the horizontal direction between the pair of adjoining stitched portions (21), and a shoulder belt attaching member (a6 to a9) that is a rectangular ring is attached to each pass-through part. The rectangular ring is a ring (an annular member) formed of a resin or a metal with a rectangular planar shape. That is, the shoulder belt attaching member (a6 to a9) is configured by letting the first shoulder belt or the cloth belt thereabove to pass through the annular rectangular ring.

Annular waist belt attaching portions (a10 to a12) passing all the way through in the width direction of the first backing member (a1) are formed between adjoining rectangular rings in the vertical direction, i.e., between the respective pairs of the stitched portions (21). Furthermore, respective another ends of the first shoulder belts (a4 and a5) are stitched to lower both sides of the first backing member (a1). One of the first shoulder belts (a4 and a5) at one side and another first shoulder belt coupled together have a latching member of the buckle and a catching member thereof attached to respective first shoulder belts in a freely detachable manner. More specifically, a sub belt (22) is provided at respective middle portions of the first shoulder belts (a4 and a5) so as to run across the first shoulder belts (a4 and a5) in the width direction. Sub buckles (a16 and a11) for the first shoulder belts are provided at respective tips of the sub belt (22). The structure of the safety belt of the present invention is not limited to the above-explained embodiment and embodiments to be discussed later.

Next, an explanation will be given of the passenger wearing component (B). As shown in FIG. 1, the passenger wearing component (B) includes a tabular second backing member (b1) that is a basal component. According to this example, the second backing member (b1) for a passenger is formed to a smaller size than that of the first backing member (a1). The second backing member can be formed to the same size, and the size thereof is optional. The second backing member may be formed of the same material as that of the first backing member (a1), but can be formed of any material. Furthermore, passenger wearing components (B) with various sizes may be prepared and selected as needed depending on the passenger, and may be combined with the driver wearing component (A) described above in order to configure the safety belt of the present invention.

An end of a second waist belt (b2) is stitched to one-end side of the lower part of the second backing member (b1) in the width direction. The second waist belt (b2) has a buckle (b7) and a second waist belt adjuster (b9) attached to the tip of the second waist belt. Moreover, a member (b8) coupled with the buckle (b7) of the second waist belt (b2) is stitched to another-end side of the lower part of the second backing member (b1) in the width direction.

Respective one ends of two second shoulder belts (b3 and b4) which are a pair are stitched to the proximity of the upper end of the second backing member (b1), and adjusters (b5 and b6) are attached to arbitrary locations of respective second shoulder belts (b3 and b4). Respective another ends of the second shoulder belts (b3 and b4), i.e., the ends located at the front of the passenger are inserted, as will be described later, in any of the multiple rectangular rings (a6, a7, a8, and a9) provided on the first backing member (a1) of the driver wearing component (A) in the vertical direction, and are fixed to a predetermined length using the adjusters (b5 and b6).

(Advantage)

Next, an explanation will be given of how to use the safety belt of the present invention.

First, with reference to FIG. 1, a brief explanation will be given of how to couple the driver wearing component (A) and the passenger wearing component (B).

The front ends (tips) of the second shoulder belts (b3 and b4) connected to the second backing member (b1) of the passenger wearing component (B) are coupled with any of the multiple rectangular rings (a6, a7, a8, and a9) (in FIG. 1, reference numeral a8) provided in the vertical direction (the height direction when attached to the driver (the longitudinal direction)) on the rear face (back face) of the first backing member (a1), i.e., the face opposite to the surface facing the back of the driver. At the same time, the second waist belt (b2) coupled to the second backing member (b1) is coupled with any of the multiple waist belt attaching portions (a10, a11, and a12) (in FIG. 1, reference numeral a12) provided in the vertical direction on the rear face of the first backing member (a1).

The detail of the structure of the embodiment of the present invention will be explained below together with the flow of procedures of attaching the safety belt to the driver and the passenger of a two-wheeled vehicle with reference to FIGS. 2 to 6. The feature of the embodiment in which the safety belt of the present invention can change a coupling position of the driver wearing component (A) and the passenger wearing component (B) in accordance with the difference in physical size between the driver and the passenger and the difference in height between the seating position for the driver of the two-wheeled vehicle and the seating position for the passenger thereof will be explained with reference to FIGS. 7, 8 and 9.

First, an explanation will be given of procedures of selecting as needed the coupling position of the two components: the driver wearing component (A) and the passenger wearing component (B) in accordance with the difference in physical size between the driver and the passenger and the difference in height between the seating position for the driver of the two-wheeled vehicle and the seating position for the passenger thereof (hereinafter, collectively referred to as "in accordance with the difference in physical size, etc.") in advance, and the preparation for coupling those together. The explanation will be next given of procedures of adjusting and coupling the components in accordance with the physical size, etc., between the driver and the passenger, and procedures of causing the driver and the passenger to wear the safety belt and to ride on the two-wheeled vehicle.

Figure 2:
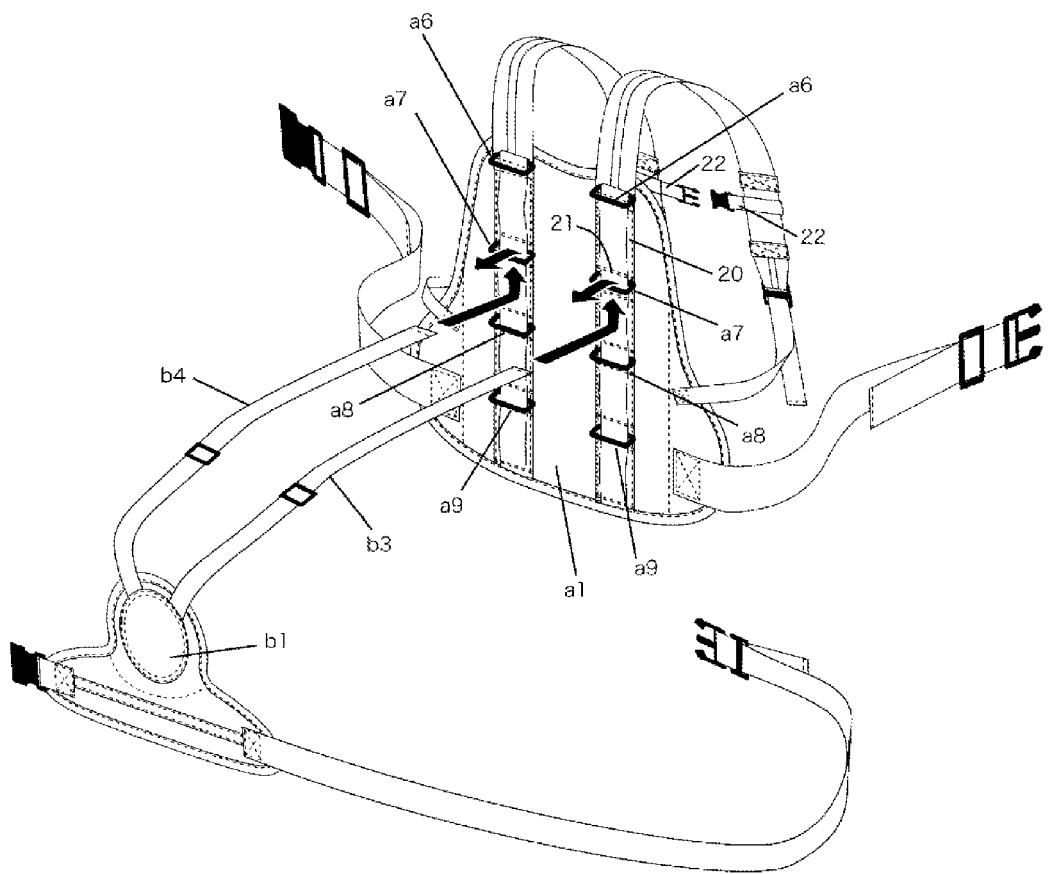
FIG. 2 is an explanatory diagram showing a first procedure of attaching the safety belt of the present invention and the structure thereof.

First, as shown in FIG. 2, respective front ends of the second shoulder belts (b3 and b4) connected to the second backing member (b1), i.e., the ends located at the front of the passenger are inserted in any of the multiple rectangular rings (a6, a7, a8, and a9) provided in the vertical direction on the rear face of the first backing member (a1). At this time, in which rectangular ring (a6, a7, a8, and a9) the end of the second shoulder belt is inserted is selected in accordance with the difference in physical size, etc., between the driver and the passenger.

Figure 9:
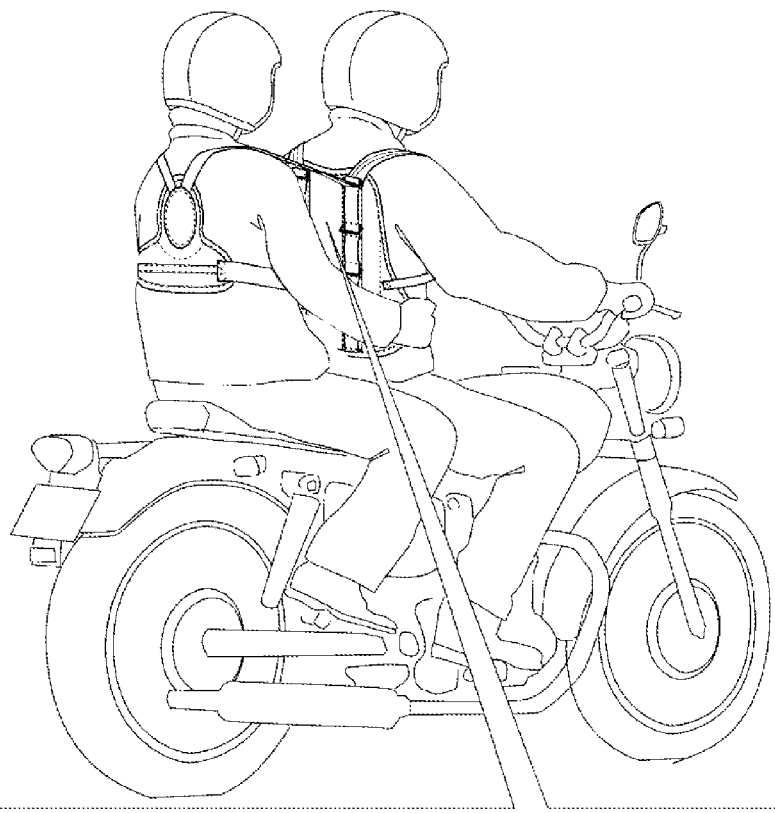
FIG. 9 is an explanatory diagram showing a change in a third coupling position of the safety belt of the present invention.
Figure 9:
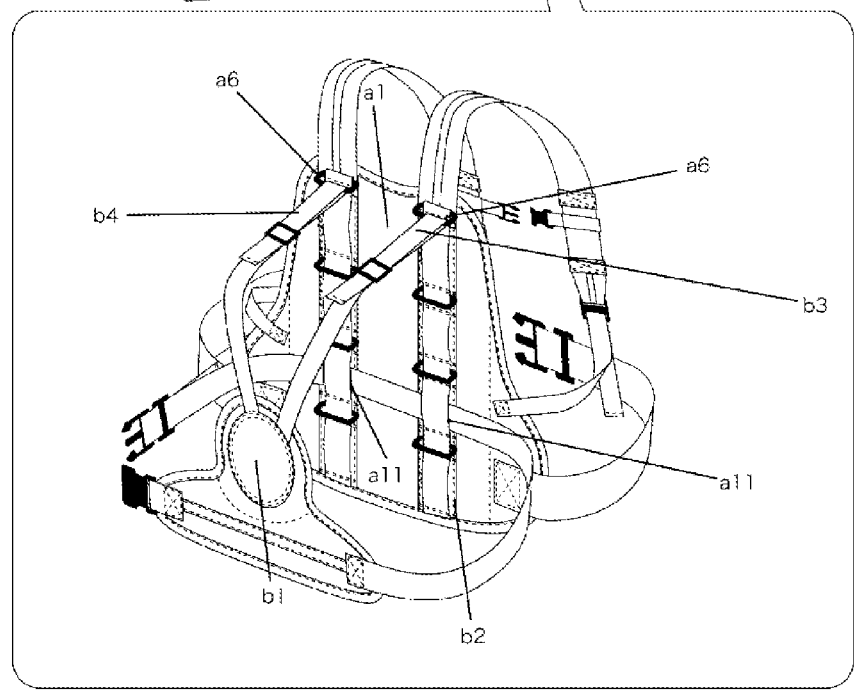

In the example shown in FIG. 2, respective front ends of the second shoulder belts (b3 and b4) are inserted in the rectangular rings (a7) second from the top, but in accordance with the difference in physical size, etc., the position of inserting the front end of each of the second shoulder belts (b3 and b4) can be selected from any of the multiple rectangular rings (a6, a7, a8, and a9). For example, when the difference in height between the seating position for the driver and the seating position for the passenger is substantially zero, and the passenger has substantially same height as that of the driver, as shown in FIG. 9, the uppermost rectangular ring (a6) is selected, which enables an appropriate attachment of the safety belt of the present invention.

Figure 3:
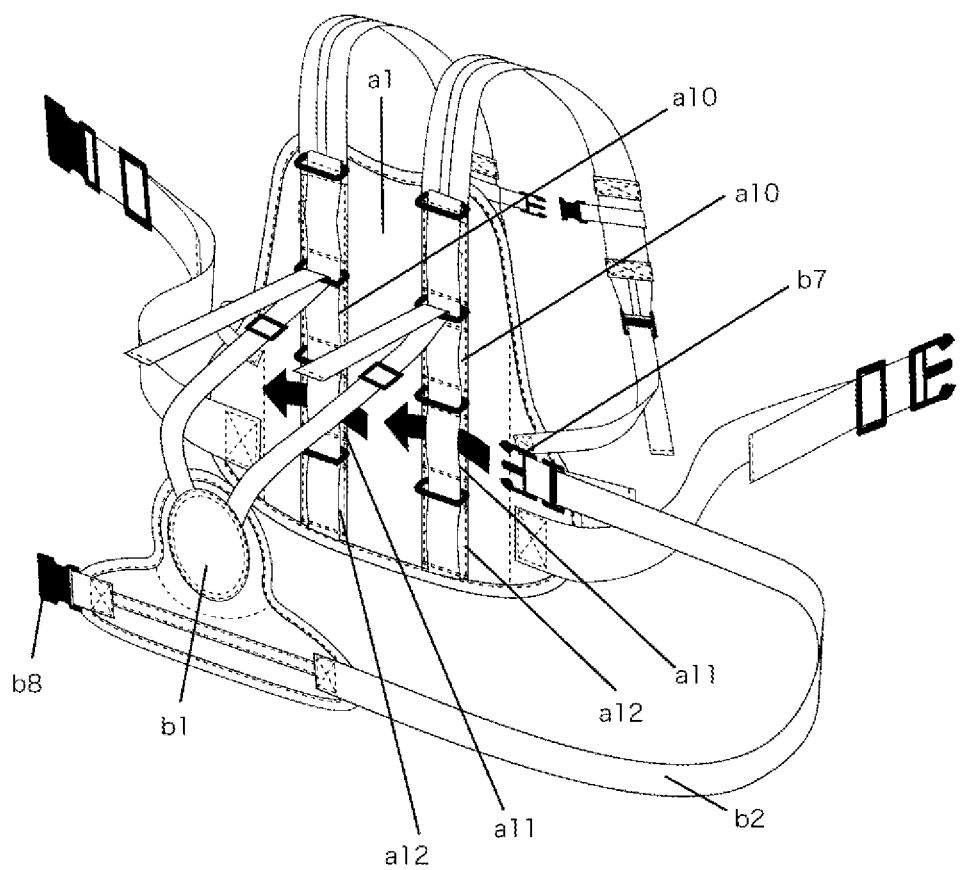
FIG. 3 is an explanatory diagram showing a second procedure of attaching the safety belt of the present invention and the structure thereof.

Next, as shown in FIG. 3, the tip of the second waist belt (b2) connected to the second backing member (b1) is inserted in any of the multiple waist belt attaching portions (a10, a11, and a12) provided in the vertical direction on the rear face of the first backing member (a1). At this time, also, in which waist belt attaching portion (a10, a11, and a12) the tip of the second waist belt is inserted is selected in accordance with the difference in physical size, etc., between the driver and the passenger.

In the example shown in FIG. 3, the tip of the second waist belt (b2) is inserted in the waist belt attaching portion (a11) second from the bottom, but in accordance with the difference in physical size, etc., the position of inserting the tip of the second waist belt (b2) can be selected from any of the multiple waist belt attaching portions (a10, a11, and a12). For example, when the difference in height between the seating position for the driver and the seating position for the passenger is substantially zero and the passenger has substantially same height as that of the driver, as shown in FIG. 9, the waist belt attaching portion (a11) second from the bottom is selected, which enables an appropriate attachment of the safety belt of the present invention.

When selection of the coupling position in accordance with the difference in physical size, etc., and preparation for coupling complete through the above-explained procedures, the safety belt of the present invention is adjusted in accordance with respective physical sizes of the driver and the passenger, and the components are coupled together through procedures described below, thereby completing attachment of the safety belt of the present invention.

Figure 4:
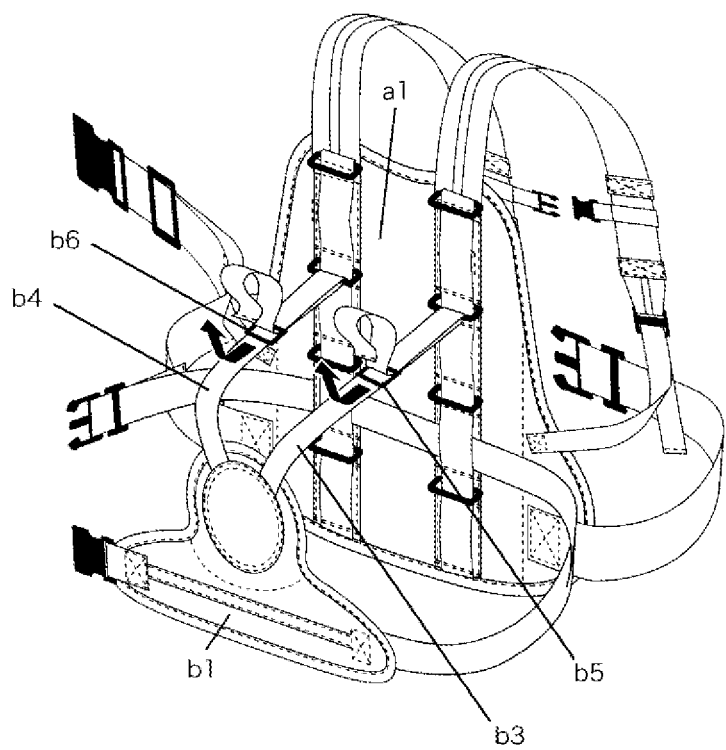
FIG. 4 is an explanatory diagram showing a third procedure of attaching the safety belt of the present invention and the structure thereof.

First, through the same scheme explained with reference to FIG. 2, respective tips of the second shoulder belts (b3 and b4) inserted in any of the rectangular rings (a6, a7, a8, and a9) are inserted in the second shoulder belt adjusters (b5 and b6) as shown in FIG. 4. Next, the second shoulder belts (b3 and b4) are coupled with the first backing member (a1) while adjusting the length of the second shoulder belts in accordance with the physical size of the passenger.

Figure 5:
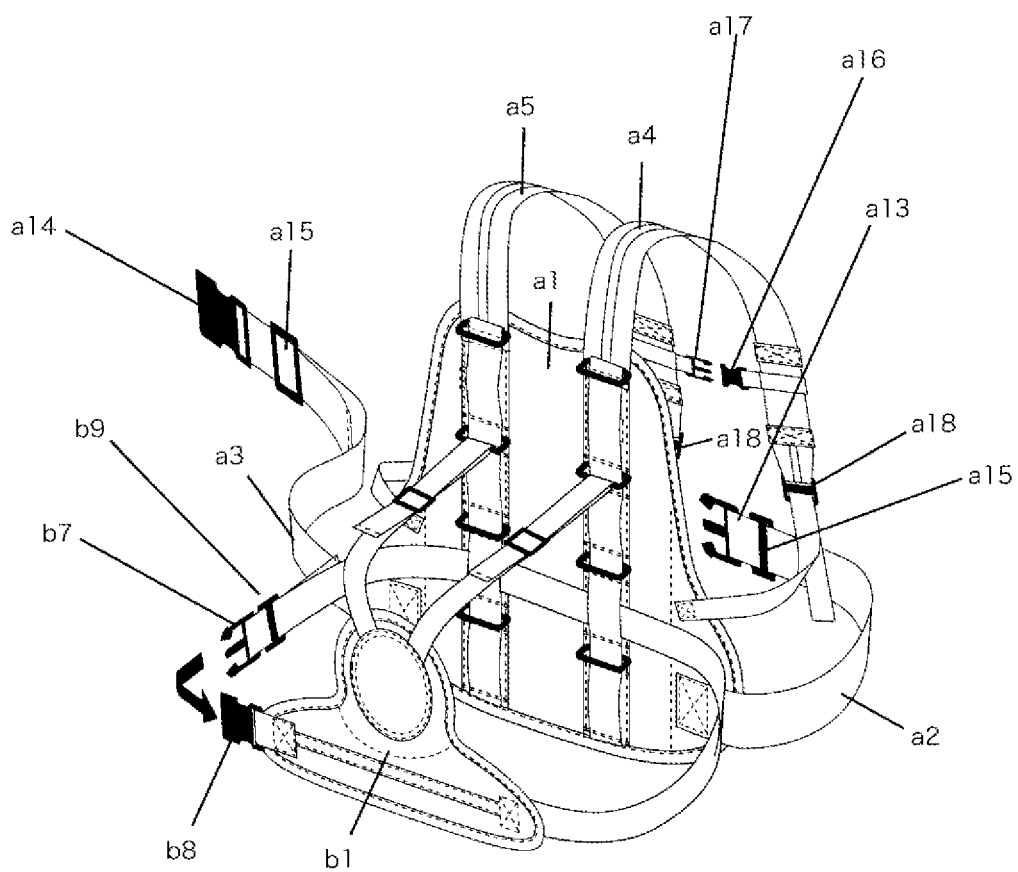
FIG. 5 is an explanatory diagram showing a fourth procedure of attaching the safety belt of the present invention and the structure thereof.

Thereafter, through the same scheme explained with reference to FIG. 3, the second waist belt buckle (the latching member) (b7) provided at the tip of the second waist belt (b2) inserted in any of the waist belt attaching portions (a10, a11, and a12) provided on the first backing member (a1) is coupled with the second waist belt buckle (the catching member) (b8) connected to the second backing member (b1) as shown in FIG. 5. When coupling the second waist belt buckles (b7 and b8), the length of the second waist belt (b2) is adjusted using the second waist belt adjuster (b9) in accordance with the physical size of the passenger.

Next, using the first shoulder belt adjuster (a18) provided at respective middle portions of the first shoulder belts (a4 and a5) connected to the first backing member (a1), the lengths of the first shoulder belts (a4 and a5) are adjusted in accordance with the physical size of the driver.

Next, respective lengths of the first waist belts (a2 and a3) connected to the first backing member (a1) are adjusted using the first waist belt adjuster (a15) in accordance with the physical size of the driver. Thereafter, the first waist belts (a2 and a3) are coupled together using the first waist belt buckles (a13 and a14) attached to respective tips of the first waist belts at the driver side.

Furthermore, the first shoulder belt sub buckles (a16 and a11) provided at the tip of the sub belt 22 are coupled together which are provided at respective middle portions of the first shoulder belts (a4 and a5) connected to the first backing member (a1). This prevents the first shoulder belts (a4 and a5) from moving and getting out of the appropriate position together with a motion of the passenger.

Figure 6:
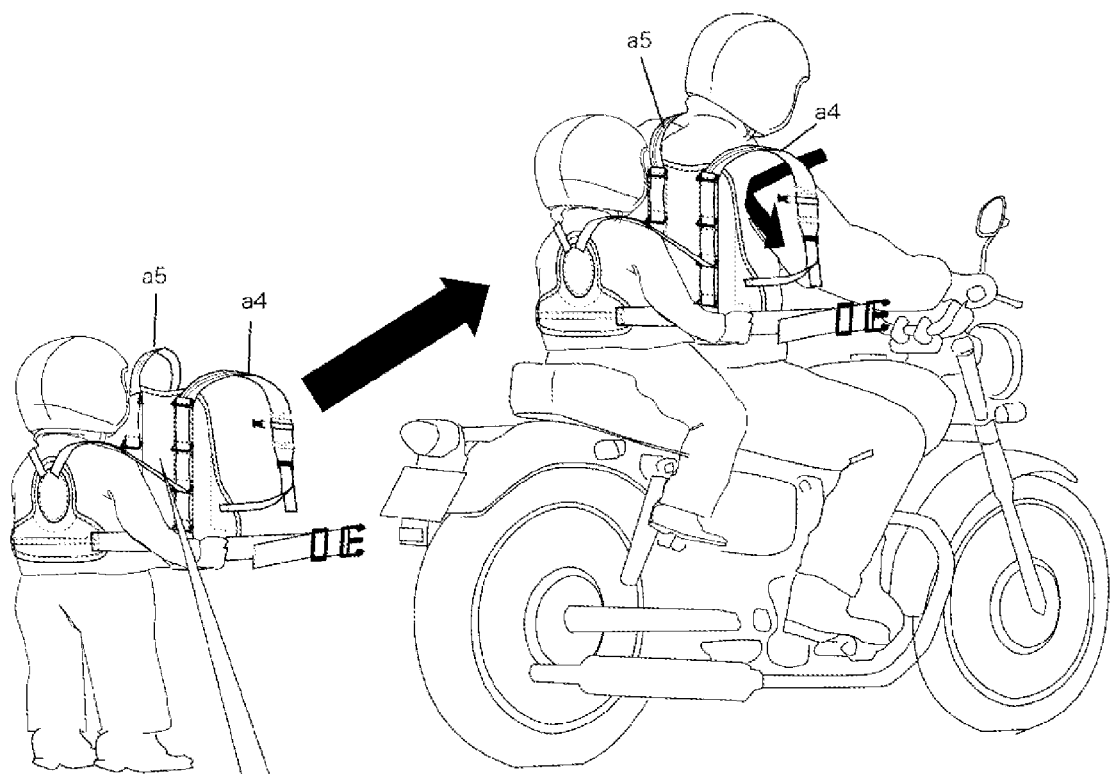
FIG. 6 is an explanatory diagram showing a fifth procedure of attaching the safety belt of the present invention and the structure thereof.
Figure 6:
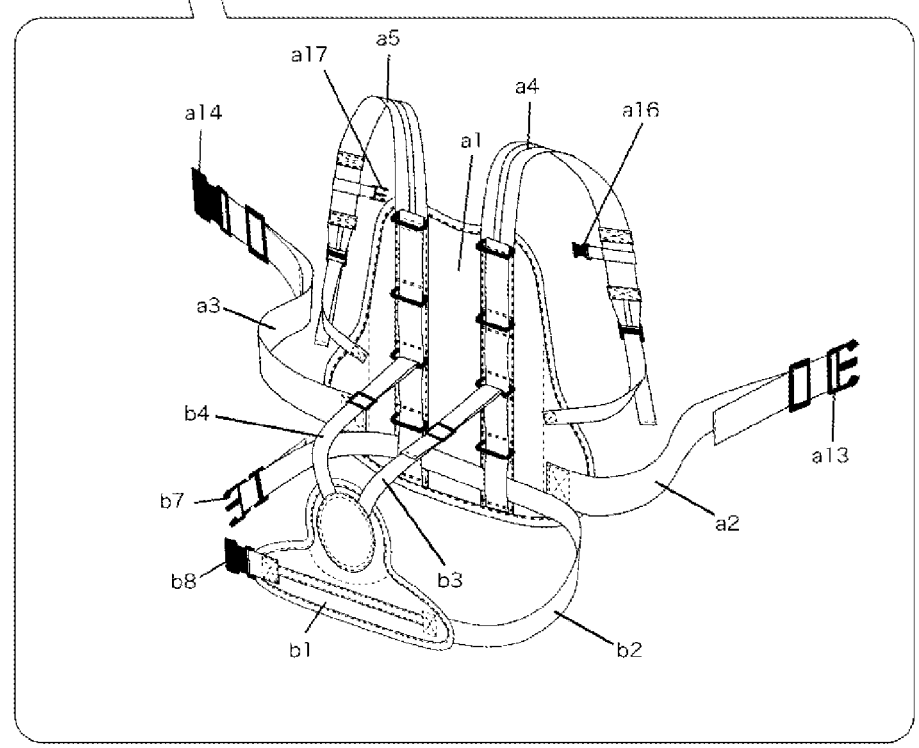

Next, with reference to FIG. 6, procedures of attaching the safety belt of the present invention and riding on a two-wheeled vehicle will be described. First, as shown in the upper left part of FIG. 6, with the passenger wearing component (B) being coupled with the driver wearing component (A), the passenger wearing component is attached to the passenger.

At this time, attachment of the passenger wearing component (B) to the passenger is carried out by letting the head of the passenger to pass through between the pair of second shoulder belts (b3 and b4) adjusted in accordance with the physical size of the passenger in advance. Next, the passenger attaching the passenger wearing component (B) coupled with the driver wearing component (A) as shown in FIG. 6 rides on the seating position for the passenger after the driver rides on the seating position for the driver of the two-wheeled vehicle.

Subsequently, as shown in the upper right part of FIG. 6, the driver lets both arms thereof to pass through the pair of first shoulder belts (a4 and a5) which are connected to the first backing member (a1) of the driver wearing component (A) coupled to the passenger wearing component (B) attached to the riding passenger and which are adjusted in accordance with the physical size of the driver in advance like shouldering a backpack. Next, the first waist belts (a2 and a3) connected to the first backing member (a1) and adjusted in accordance with the physical size of the driver in advance are attached around the waist of the driver, and the first waist belt buckles (a13 and a14) are coupled together at the driver side. Furthermore, the first shoulder belt sub buckles (a16 and a17) adjusted in accordance with the physical size of the driver in advance are coupled together, and thus attachment of the safety belt of the present invention completes.

Next, an explanation will be given of an example case in which the coupling position of the driver wearing component (A) and the passenger wearing component (B) of the safety belt of the present invention is changed in accordance with the difference in the physical size, etc., between the driver and the passenger with reference to FIGS. 7, 8, 9, 10, and 11.

Figure 7:
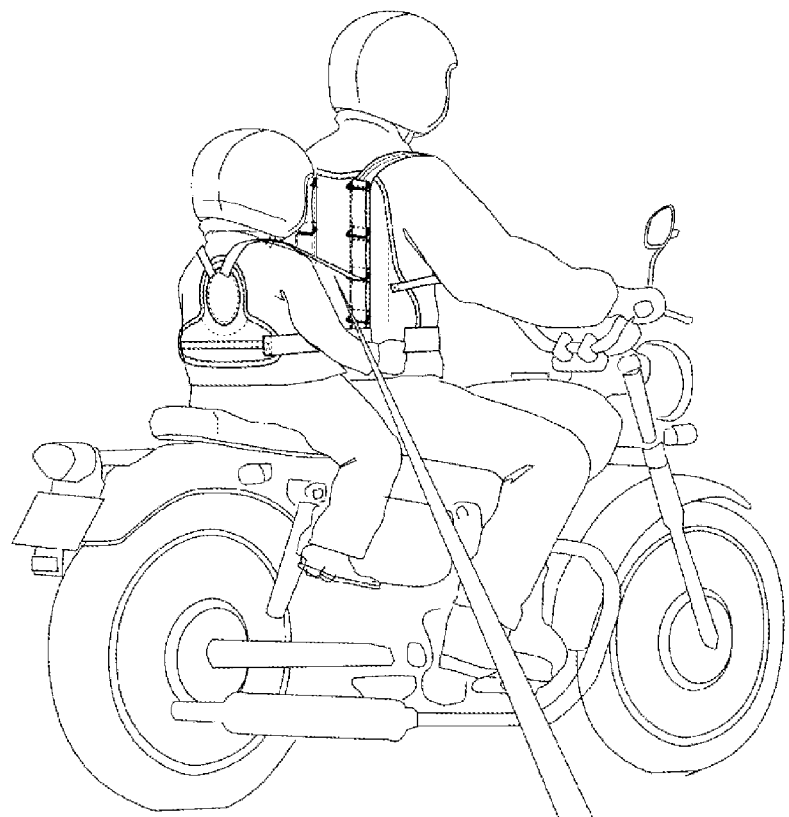
FIG. 7 is an explanatory diagram showing a change in a first coupling position of the safety belt of the present invention.
Figure 7:
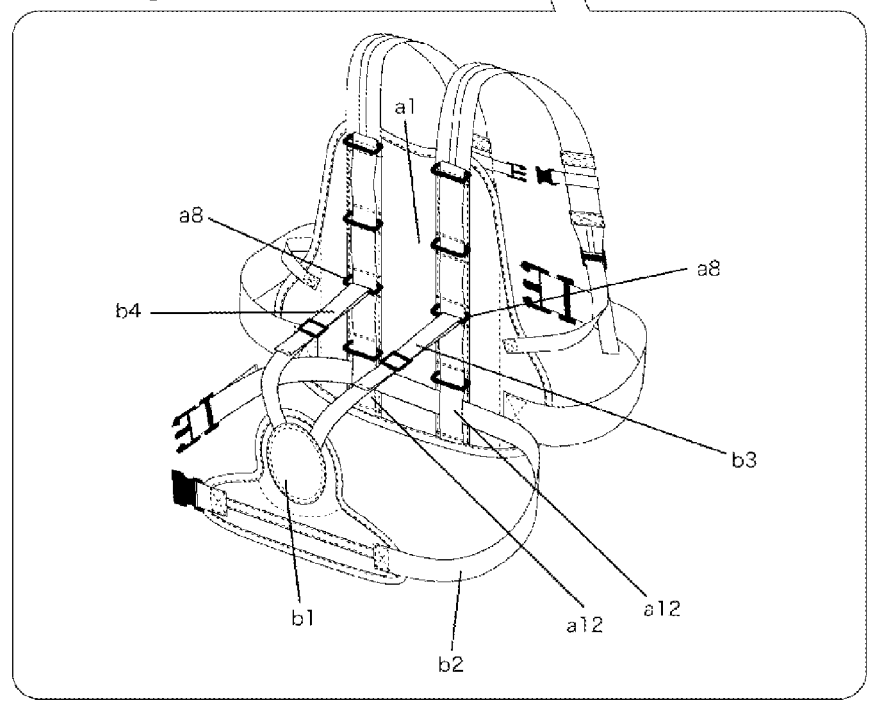

FIG. 7 shows an example case in which the height of the seating position for the driver of a two-wheeled vehicle is substantially same as that of the seating position for the passenger, and, for example, the driver is an adult male and the passenger is a young child. According to this example, the second shoulder belts (b3 and b4) are coupled with the third rectangular rings (a8) from the top provided on the first backing member (a1) and the second waist belt (b2) is coupled with the lowermost waist belt attaching portion (a12) provided on the first backing member (a1). This maintains the stability of the riding posture of the passenger and accomplishes an effect of preventing the passenger from falling.

Figure 8:
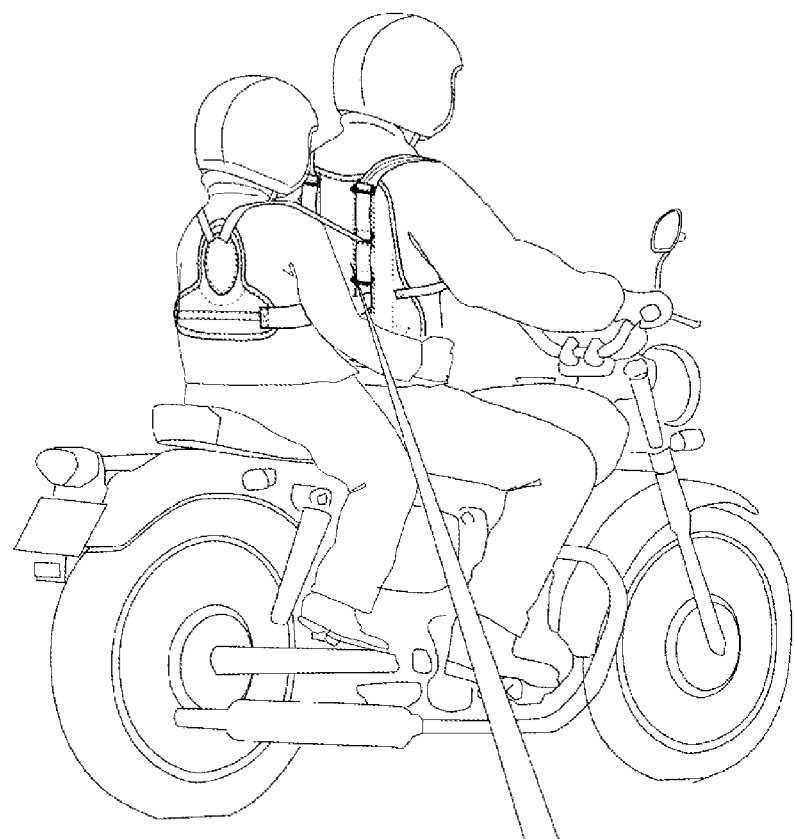
FIG. 8 is an explanatory diagram showing a change in a second coupling position of the safety belt of the present invention.
Figure 8:
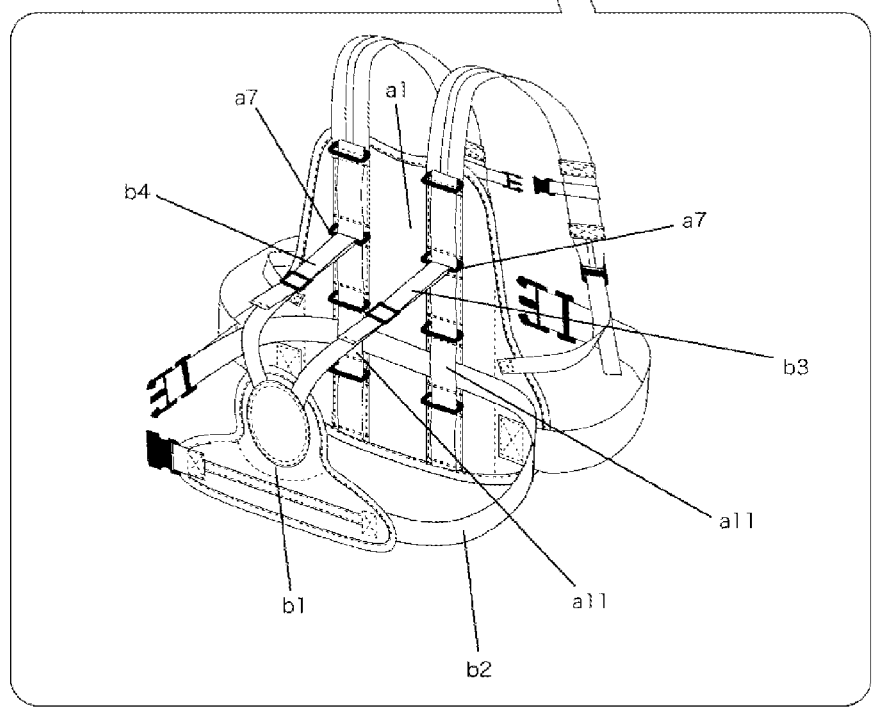

FIG. 8 shows an example case in which the height of the seating position for the driver of a two-wheeled vehicle is substantially same as that of the seating position for the passenger and, for example, the driver is an adult male and the passenger is a child within a range from an elementary school student to a junior high-school student. According to this example, the second shoulder belts (b3 and b4) are coupled with the second rectangular rings (a7) from the top provided on the first backing member (a1) and the second waist belt (b2) is coupled with the third waist belt attaching portion (a11) from the top provided on the first backing member (a1). This maintains the stability of the riding posture of the passenger and accomplishes an effect of preventing the passenger from falling.

FIG. 9 shows an example case in which the height of the seating position for the driver of a two-wheeled vehicle is substantially same as that of the seating position for the passenger and, for example, the driver and the passenger have the similar physical sizes, respectively. According to this example, the second shoulder belts (b3 and b4) are coupled with the uppermost rectangular rings (a6) provided on the first backing member (a1) and the second waist belt (b2) is coupled with the third waist belt attaching portion (a11) from the top provided on the first backing member (a1). This maintains the stability of the riding posture of the passenger and accomplishes an effect of preventing the passenger from falling.

Figure 10:
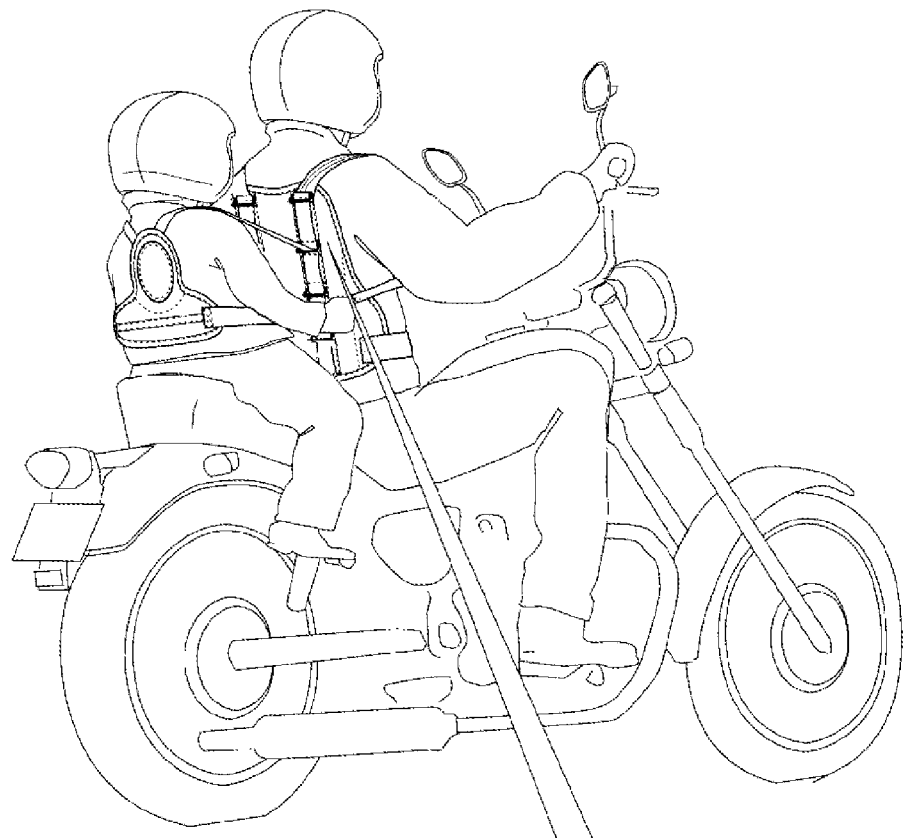
FIG. 10 is an explanatory diagram showing a change in a fourth coupling position of the safety belt of the present invention.
Figure 10:
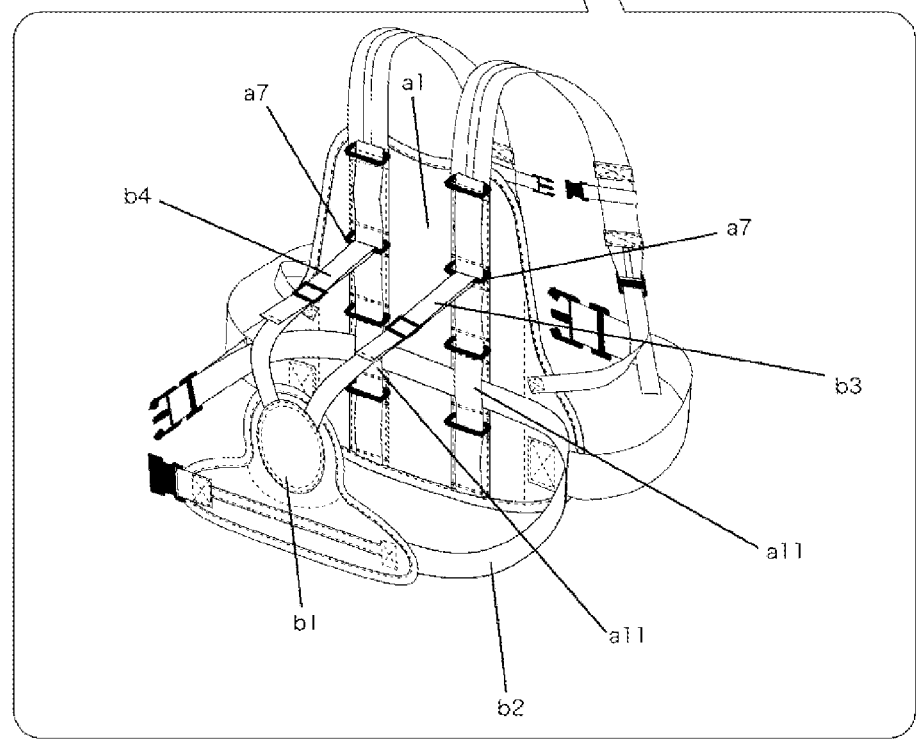

FIG. 10 shows an example case in which the height of the seating position for the driver of a two-wheeled vehicle is lower than that of the seating position for the passenger and, for example, the driver is an adult male and the passenger is a young child. According to this example, the second shoulder belts (b3 and b4) are coupled with the second rectangular rings (a7) from the top provided on the first backing member (a1) and the second waist belt (b2) is coupled with the third waist belt attaching portion (a11) from the top provided on the first backing member (a1). This maintains the stability of the riding posture of the passenger and accomplishes an effect of preventing the passenger from falling.

Figure 11:
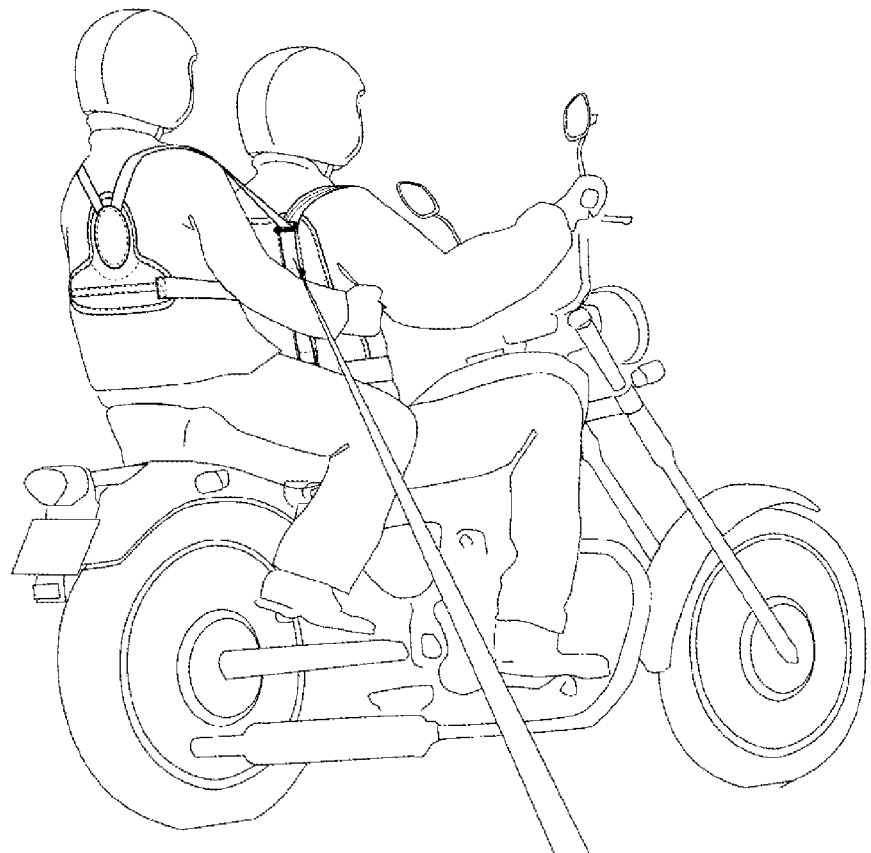
FIG. 11 is an explanatory diagram showing a change in a fifth coupling position of the safety belt of the present invention.
Figure 11:
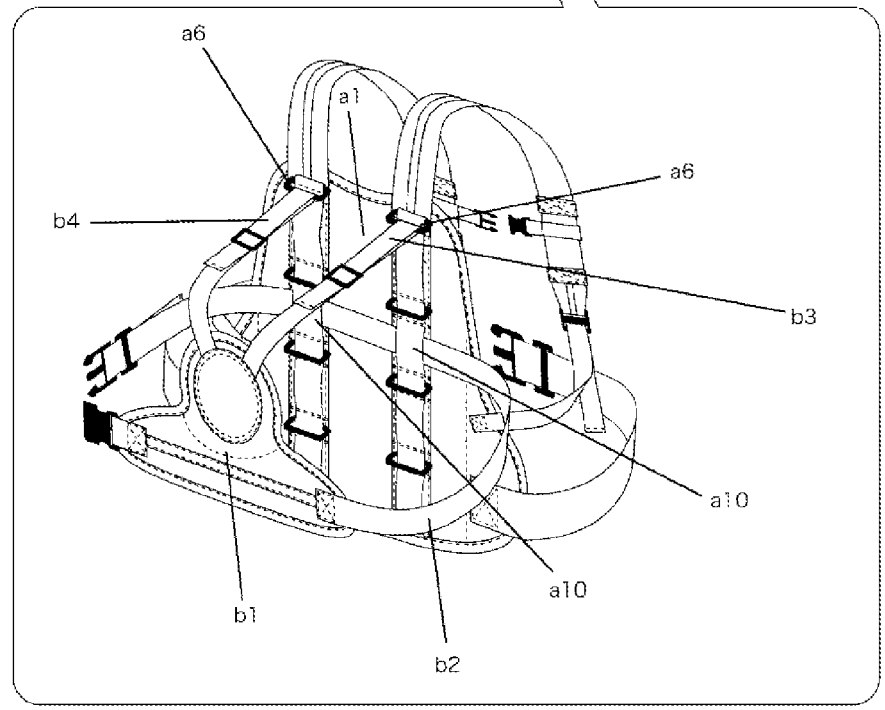

FIG. 11 shows an example case in which the height of the seating position for the driver of a two-wheeled vehicle is lower than that of the seating position for the passenger, and the driver and the passenger have similar physical sizes, respectively. According to this example, the second shoulder belts (b3 and b4) are coupled with the uppermost rectangular rings (a6) provided on the first backing member (a1) and the second waist belt (b2) is coupled with the second waist belt attaching portion (a10) from the top provided on the first backing member (a1). This maintains the stability of the riding posture of the passenger and accomplishes an effect of preventing the passenger from falling.

(Modified Examples)

Figure 12:
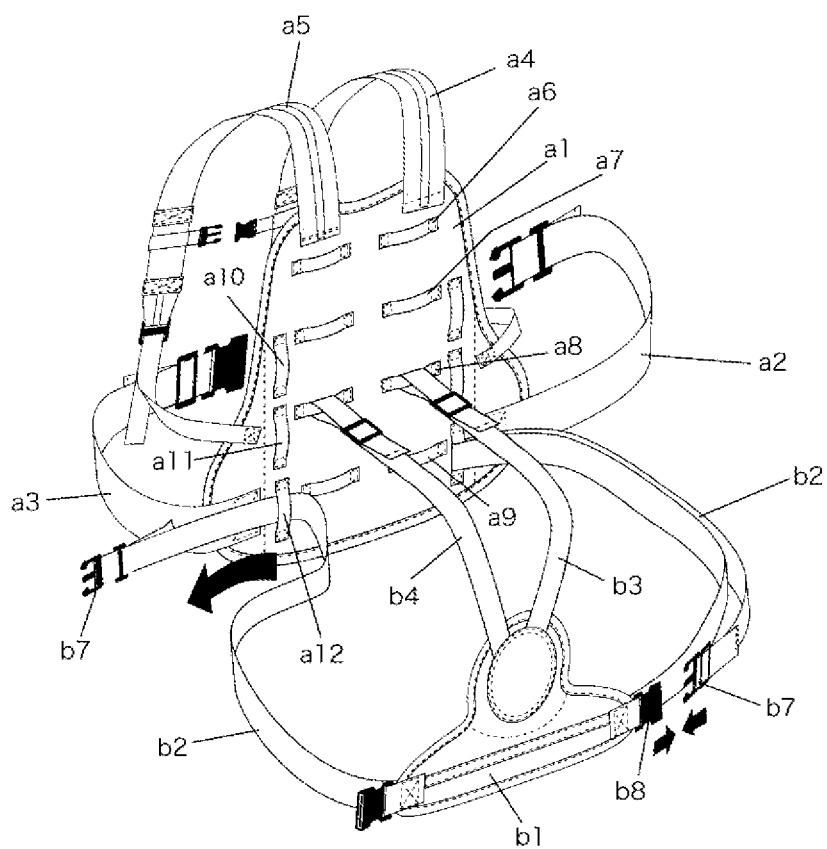
FIG. 12 is a perspective view showing a modified example of the safety belt of the present invention.

The explanation was given of a case in the above-explained embodiment in which the first backing member (a1) is provided with the backing belts (20) that are provided with the shoulder belt attaching members (a6 to a9) and the waist belt attaching portions (a10 to a12), but the present invention is not limited to the above-explained structure. For example, as shown in FIG. 12, two short belt members (thick cloths, etc.,) with a predetermined length may be disposed in parallel with each other and with a predetermined clearance on the rear side (rear face side) of the first backing member (a1), i.e., the opposite surface to the surface facing the back of the driver, and respective ends of the short belts may be stitched to the first backing member, thus the shoulder belt attaching members (a6 to a9) may be provided. Likewise, short belt members (thick cloths, etc.,) may be disposed vertically and with a predetermined clearance in the height direction on both sides of the first backing member (a1), and respective ends of the short belts may be stitched to the first backing member, thus the waist belt attaching portions (a10 to a12) may be provided.

Figure 13:
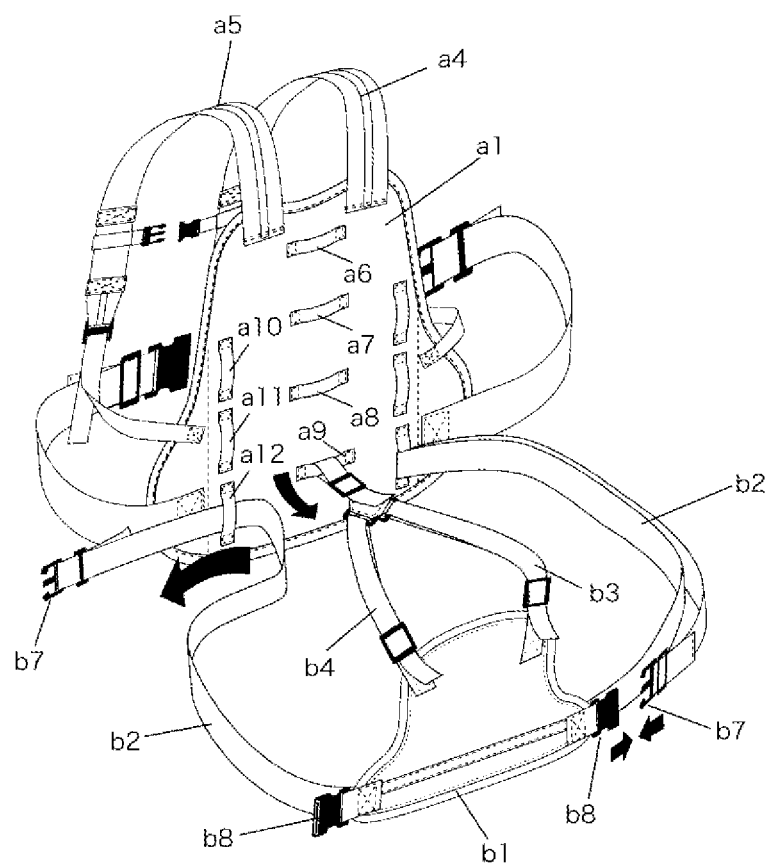
FIG. 13 is a perspective view showing a modified example of the safety belt of the present invention.

Moreover, according to the above-explained embodiment, the first backing member (a1) is provided with two pieces of backing belts (20) in a two-line manner and each piece is provided with the shoulder belt attaching members (a6 to a9). Instead of this structure, as shown in FIG. 13, the shoulder belt attaching members (a6 to a9) may be provided in a line. That is, the shoulder belt attaching members (a6 to a9) formed of the two pieces of short belt members (thick cloths, etc.,) disclosed in FIG. 12 and stitched in parallel with each other may be attached to the center of the first backing member (a1) in the width direction in a line. In this case, as shown in FIG.

13, respective tips of the pair of second shoulder belts (b3 and b4) are coupled to one shoulder belt attaching member (any of a6 to a9).

More specifically, according to the example shown in FIG. 13, the pair of second shoulder belts (b3 and b4) have respective tips coupled together and are in a Y shape. In other words, the pair of second shoulder belts (b3 and b4) have respective one ends connected to the second backing member (b1) and have respective another ends coupled together, so that the pair of second shoulder belts form a loop, and the head of the passenger is inserted in this loop. Accordingly, the mutual coupled portion of the pair of second shoulder belts (b3 and b4) is located near the front of the chest of the passenger, and a piece of belt with a predetermined length further runs from the coupled portion. Hence, the pair of second shoulder belts are formed in a Y shape as explained above. The tip of the piece of belt running from the coupled portion, i.e., the front part of such a belt located at the driver side is coupled to any of the shoulder belt attaching members (a6 to a9) arranged side by side in a line in the vertical direction at arbitrary locations.

Figure 14:
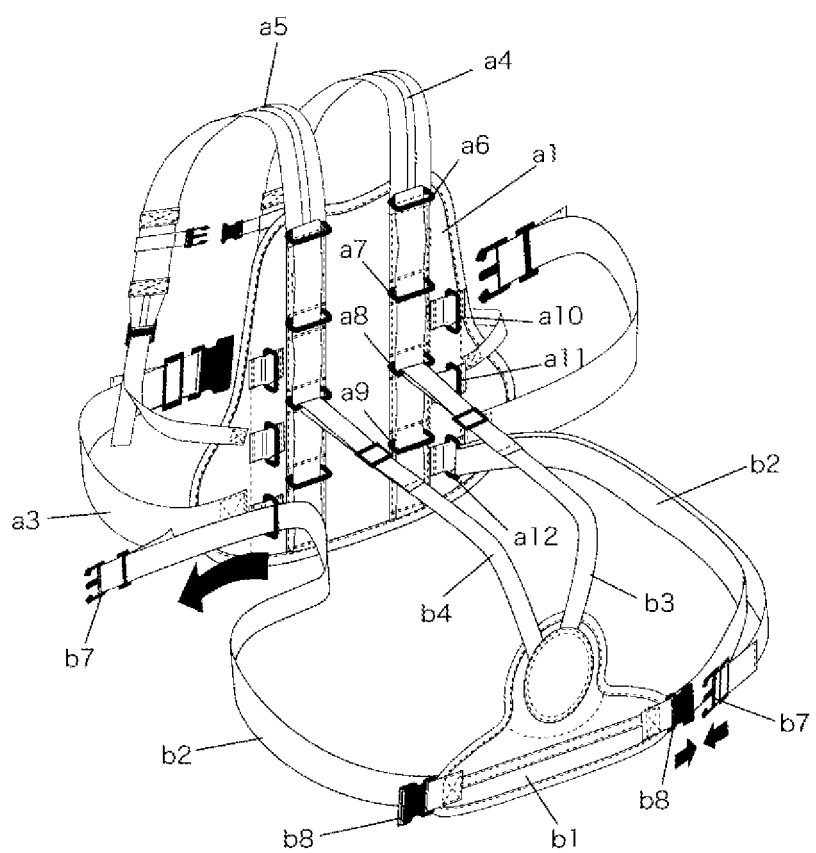
FIG. 14 is a perspective view showing a modified example of the safety belt of the present invention.
Figure 15:
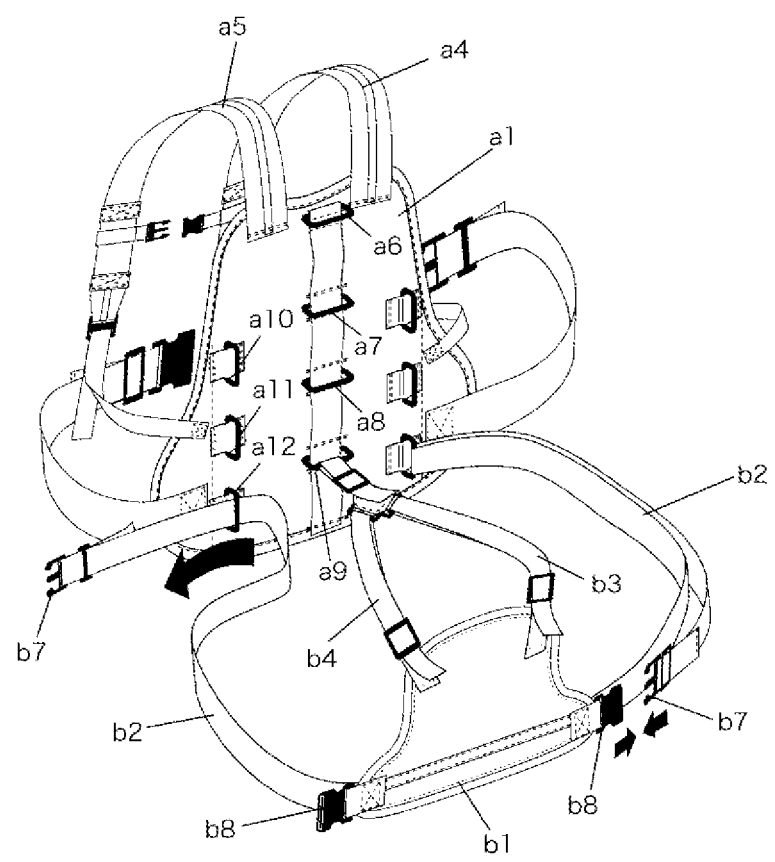
FIG. 15 is a perspective view showing a modified example of the safety belt of the present invention.

Furthermore, as shown in FIG. 14, the backing belt (20) may be provided with the multiple shoulder belt attaching members (a6 to a9) each of which is a rectangular ring, short stitched members each of which is a short belt member may be stitched to respective sides of the shoulder belt attaching members, and waist belt attaching portions (a10 to a12) which are rectangular rings may be provided in such a way that the lengthwise direction of each rectangular ring is directed in the vertical direction via the stitched member. Still further, as shown in FIG. 15, the structures shown in FIG. 13 and FIG. 14 may be combined together. That is, according to the example shown in FIG. 15, the multiple shoulder belt attaching members (a6 to a9) which are rectangular rings disclosed in FIG. 14 may be provided at the center of the first backing member (a1) in the width direction in a line. Corresponding to this structure, the pair of second shoulder belts (b3 and b4) have respective ends opposite to the connected portions to the second backing member (b2) coupled together and are formed in a Y shape. The portion running from the coupled portion is coupled to any of the shoulder belt attaching members (a6 to a9) formed in a line.

Figure 16:
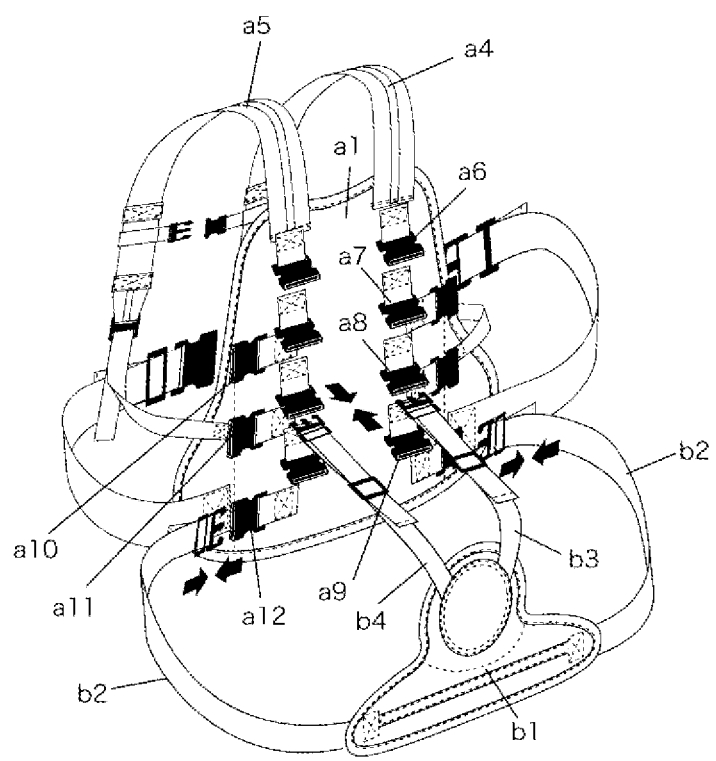
FIG. 16 is a perspective view showing a modified example of the safety belt of the present invention.

Next, FIG. 16 shows the other example. This example employs a structure in which the second shoulder belts (b3 and b4) configuring the passenger wearing component (B) are coupled with the first backing member (a1) of the driver wearing component (A) by means of buckles. More specifically, shoulder belt attaching members (a6 to a9) are stitched to the first backing member (a1) of the driver wearing component (A) via short belts, respectively, and buckles freely attachable/detachable to/from the shoulder belt attaching members (a6 to a9) are attached to respective tips of the second shoulder belts (b3 and b4). This allows a user to easily attach the second shoulder belts (b3 and b4) to an arbitrary height position. Likewise, the second waist belt (b2) configuring the passenger wearing component (B) is configured to be coupled with the first backing member (a1) of the driver wearing component (A) by means of buckles.

Figure 17:
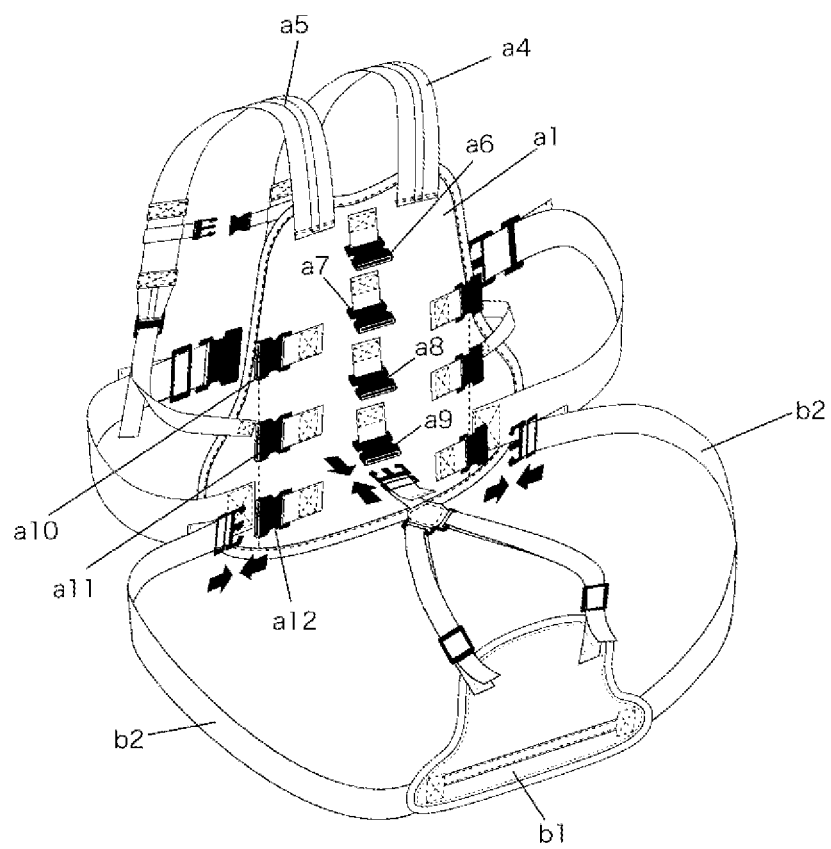
FIG. 17 is a perspective view showing a modified example of the safety belt of the present invention.

Next, FIG. 17 shows a combined structure of the structure shown in FIG. 16 and the structure shown in FIG. 15. That is, according to the example shown in FIG. 17, the shoulder belt attaching members (a6 to a9) configured by the buckles disclosed in FIG. 16 and disposed in a two-line manner are provided in a line at the center of the first backing member (a1) in a width direction. Corresponding to this structure, the pair of second shoulder belts (b3 and b4) have respective tips coupled together and are formed in a Y shape. A buckle which will be coupled with any of the shoulder belt attaching members (a6 to a9) is provided at a portion running from the coupled portion.

Figure 18:
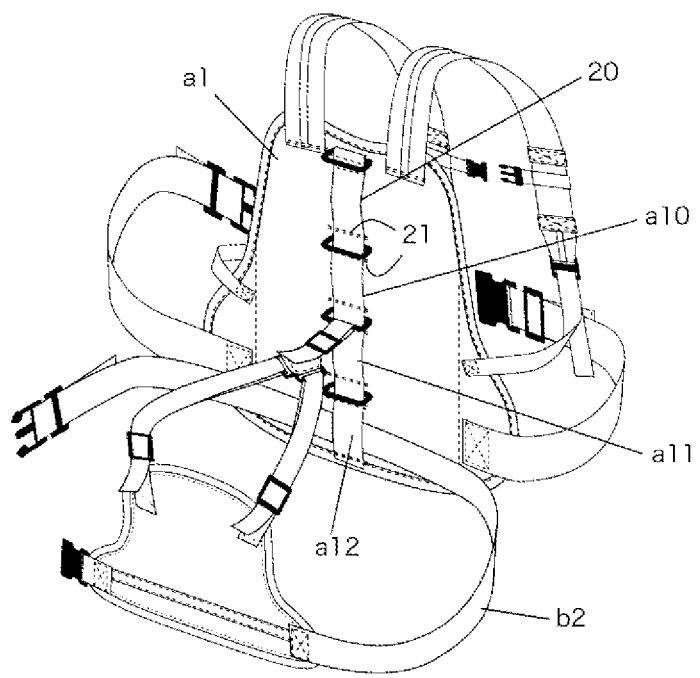
FIG. 18 is a perspective view showing a modified example of the safety belt of the present invention.

FIG. 18 shows a further other example of the present invention. The example shown in this figure is a modified example of the structure disclosed in FIG. 15 or FIG. 1. More specifically, backing belt (20) that is a band with a predetermined width is stitched to the center of the first backing member (a1) in the width direction as shown in FIG. 18. Likewise the above-explained case, the backing belt (20) is provided with a plurality of pairs of stitched portions (21) adjoining to each other in the vertical direction, and shoulder belt attaching members (a6 to a9) each of which is a rectangular ring are provided at pass-through parts formed between respective pairs of the stitched portions (21) adjoining to each other.

Moreover, annular waist belt attaching portions (a10 to a12) that pass through in the width direction of the first backing member (a1) are formed between adjoining rectangular rings in the vertical direction, i.e., respective pairs of the stitched portions (21). That is, according to the example shown in FIG. 1, the waist belt attaching portions (a10 to a12) are formed on the first backing member (a1) in a two-line manner separated from each other in the width direction, but according to this modified example, the multiple waist belt attaching portions (a10 to a12) are formed in a line at the center of the first backing member (a1) in the width direction. Hence, according to this modified example, as shown in FIG. 18, the second waist belt (b2) is let inserted in any of the waist belt attaching portions (a10 to a12) at an arbitrary height.

Figure 19:
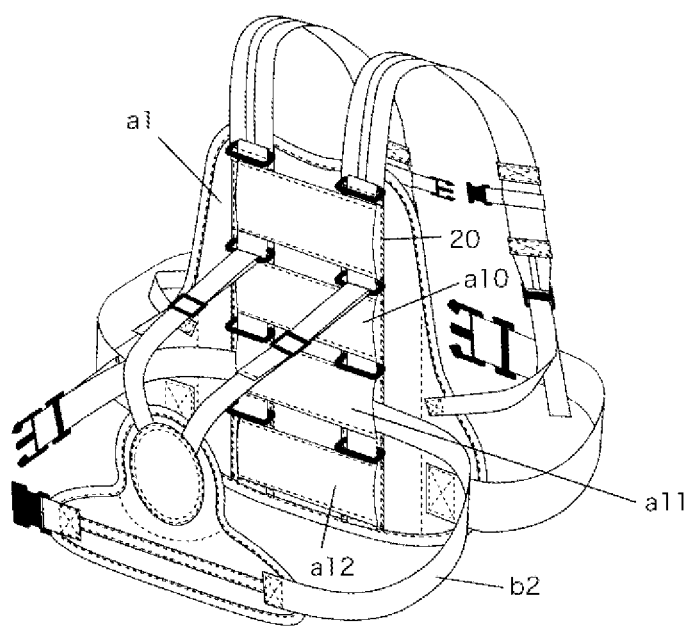
FIG. 19 is a perspective view showing a modified example of the safety belt of the present invention.

FIG. 19 shows a still-further other example of the present invention. The example shown in this figure is a modified example of the structure disclosed in FIG. 1. First, according to the example disclosed in FIG. 1, the pair of backing belts (20) formed in a two-line manner are each provided with multiple shoulder belt attaching members (a6 to a9) and the waist belt attaching portions (a10 to a12) are formed between respective shoulder belt attaching members. In contrast, according to the example shown in FIG. 19, the waist belt attaching portions (a10 to a12) are formed across the two backing belts (20). That is, portions between the shoulder belt attaching members (a6 to a9) at respective heights are each covered by a piece of cloth member, and proximities of the upper side and the lower side are stitched to the first backing member (a1). Hence, according to this modified example, waist belt attaching portions (a10 to a12) which are formed so as to pass through in the width direction of the first backing member (a1) are provided in lengths corresponding to the spaces between the two backing belts (20). Moreover, as shown in FIG. 19, the second waist belt (b2) is inserted in any of the waist belt attaching portions (a10 to a12) at a predetermined height.

Figure 20:
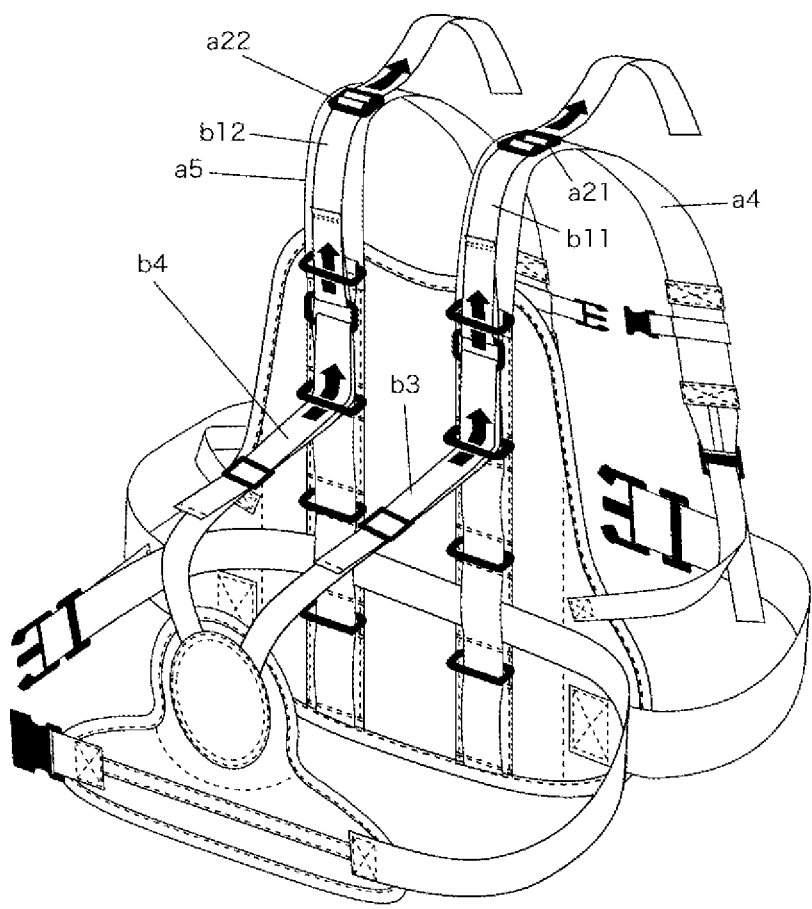
FIG. 20 is a perspective view showing a modified example of the safety belt of the present invention.
Figure 21:
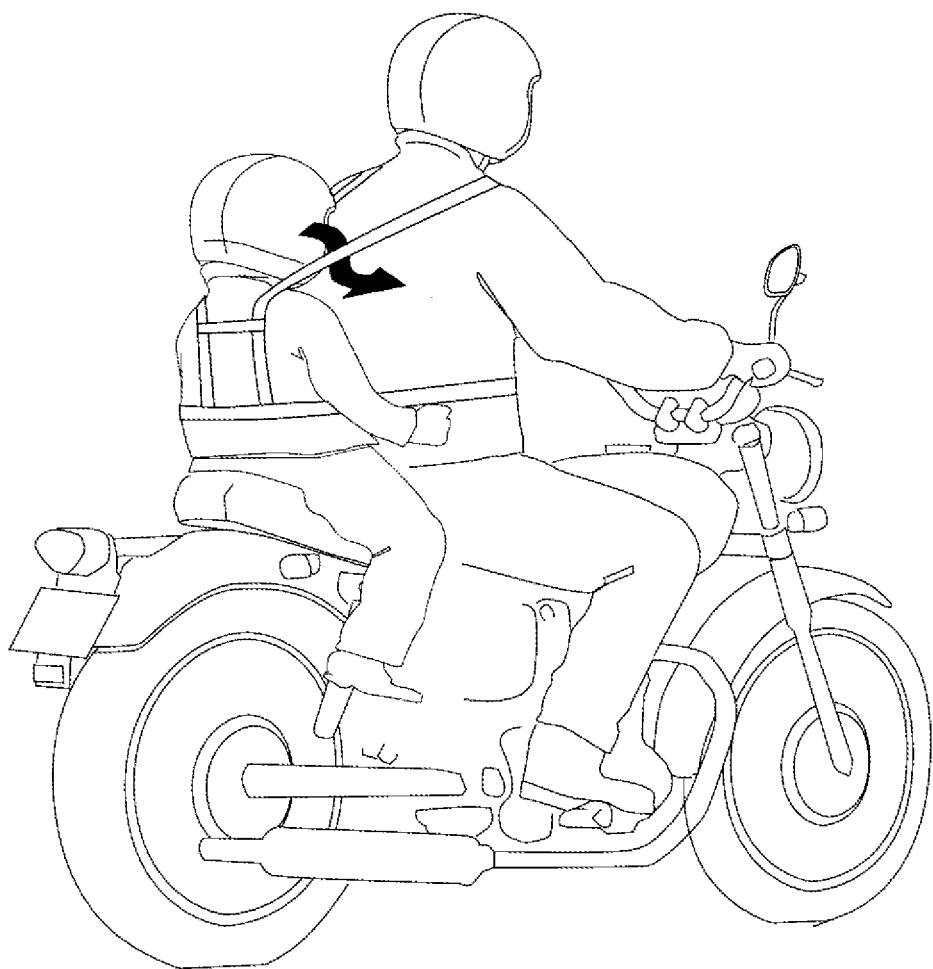
FIG. 21 is an explanatory diagram for a first technical issue of a safety belt typical of patent document 3.
Figure 22:
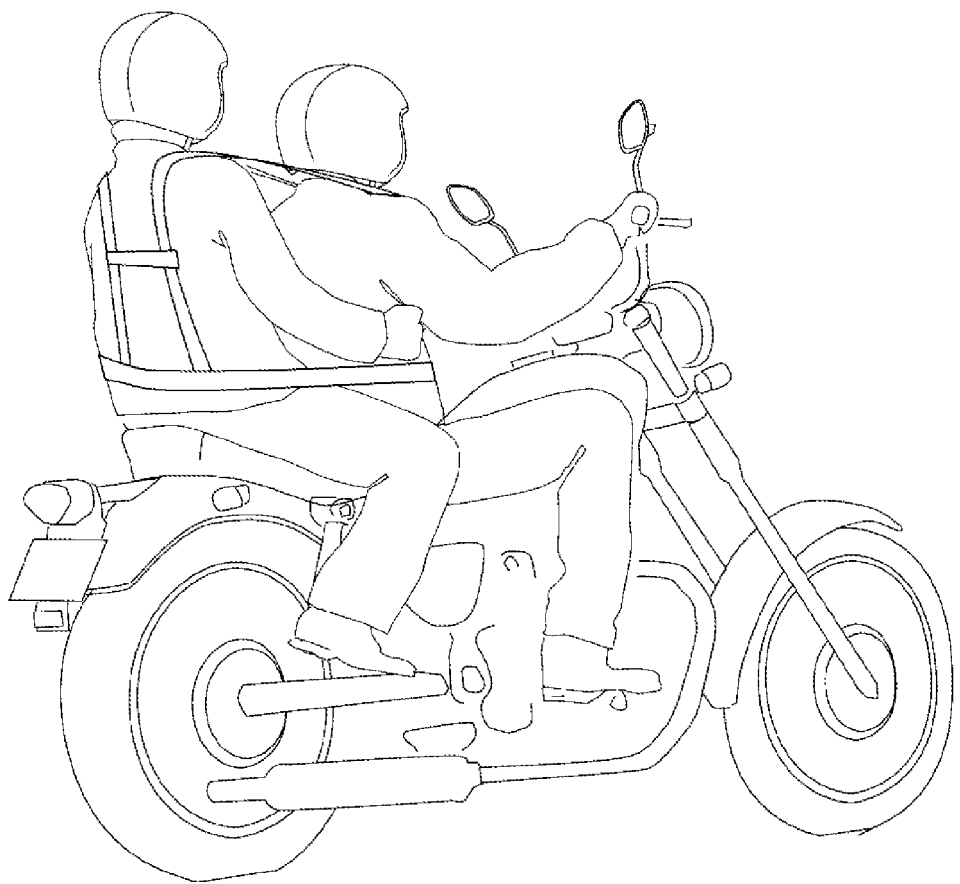
FIG. 22 is an explanatory diagram for a second technical issue of the safety belt typical of patent document 3.

FIG. 20 shows a yet-further other example of the present invention. The example shown in this figure is a modified example of the structure disclosed in FIG. 1. More specifically, a safety belt shown in FIG. 20 has pull belts (b11 and b12) which are further coupled with respective tips of the second shoulder belts (b3 and b4) inserted in the shoulder belt attaching members (a6 to a9) that are rectangular rings and which run along respective first shoulder belts (a4 and a5). In other words, the pull belts (b11 and b12) are band-like members with a predetermined length, have respective one ends coupled to the tips of respective second shoulder belts, and have respective another ends provided so as to be located near the front of the chest of the driver along respective first shoulder belts.

Moreover, the first shoulder belts (a4 and a5) are provided with respective adjusters (a21 and a22) to which respective pull belts (b11 and b12) are inserted to fasten those, and which can adjust respective lengths of the pull belts (b11 and b12). The adjusters (a21 and a22) allow a user to pull the inserted pull belts (b11 and b12) toward the opposite side to the coupled portion of the second shoulder belts (b3 and b4), i.e., toward the chest of the driver of the first shoulder belts (a4 and a5) as is indicated by an arrow in FIG. 20. Hence, by pulling the first shoulder belts (a4 and a5) in the direction of the arrow in FIG. 20, respective tips of the second shoulder belts (b3 and b4) can be pulled toward the driver side, and thus the passenger can be moved close to the driver side. The adjusters (a21 and a22) are fixed in such a way that the pull belts (b11 and b12) do not move in such a direction that no pull belt (b11 and b12) is pulled toward the passenger side. This allows the driver to easily adjust the posture of the passenger.

According to the above-explained embodiments, the shoulder belt attaching members and the waist belt attaching portions are formed in a multiple manner, and the second shoulder belts and the second waist belt are attached to ones selected from those as needed, but the structure of the safety belt of the present invention is not limited to such a structure. For example, only one shoulder belt attaching member and waist belt attaching portion may be provided beforehand, and in this case, the second shoulder belts and the second waist belt are attached to the one shoulder belt attaching member and waist belt attaching portion, respectively.

Although the present invention was explained with reference to the above-explained embodiments, the present invention is not limited to the above-explained embodiments. The detail and structure of the present invention include various changes and modifications anticipated by those skilled in the art within the scope and spirit of the present invention.

The present application claims the priority based on Japanese Patent Application No. 2009-165508 filed on Jul. 14, 2009, the disclosure of which is herein incorporated in this specification by reference.

DESCRIPTION OF REFERENCE NUMERALS

A Driver wearing component
B Passenger wearing component
a1 First backing member
a2 First waist belt
a3 First waist belt
a4 First shoulder belt
a5 First shoulder belt
a6 Rectangular ring (shoulder belt attaching member)
a7 Rectangular ring (shoulder belt attaching member)
a8 Rectangular ring (shoulder belt attaching member)
a9 Rectangular ring (shoulder belt attaching member)
a10 Waist belt attaching portion
a11 Waist belt attaching portion
a12 Waist belt attaching portion
a13 First waist belt buckle
a14 First waist belt buckle
a15 First waist belt adjuster
a16 First shoulder belt sub buckle
a17 First shoulder belt sub buckle
a18 First shoulder belt adjuster
b1 Second backing member
b2 Second waist belt
b3 Second shoulder belt
b4 Second shoulder belt
b5 Second shoulder belt adjuster
b6 Second shoulder belt adjuster
b7 Second waist belt buckle
b8 Second waist belt buckle
b9 Second waist belt adjuster
20 Backing belt
21 Stitched portion
22 Sub belt

The invention claimed is:

1. A safety belt for coupling respective upper body parts of a driver of a two-wheeled vehicle and a passenger thereof, comprising:
 a first backing member attached to a back of the driver;
 a first waist belt coupled to a lower part of the first backing member and attached around a waist of the driver;
 a pair of first shoulder belts coupled to an upper part of the first backing member and attached around shoulders of the driver;
 a second waist belt attached around a waist of the passenger;
 a pair of second shoulder belts attached around shoulders of the passenger;
 a plurality of waist belt attaching portions provided on the first backing member separately from one another in a vertical direction, the plurality of waist belt attaching portions enabling attachment of the second waist belt to the first backing member in a freely detachable manner; and
 a plurality of shoulder belt attaching members provided on the first backing member separately from one another in the vertical direction, the plurality of shoulder belt attaching members enabling attachment of respective portions of the second shoulder belts located at a front side of the passenger to the first backing member in a freely detachable manner,
 an attachment position of the second waist belt and attachment positions of the second shoulder belts to the first backing member being selectable accordingly among the plurality of waist belt attaching portions and the plurality of shoulder belt attaching members.

2. The safety belt according to claim 1, wherein
 the second waist belt includes front portions located at the driver side detachably inserted in a width direction of the first backing member in any of the plurality of waist belt attaching portions or caught by the waist belt attaching portions in a manner spaced apart from each other at a predetermined clearance in the width direction of the first backing member,
 the shoulder belt attaching members are provided above the plurality of waist belt attaching portions, and
 the pair of second shoulder belts include portions which are located at a front of the passenger and which are detachably attached to any of the plurality of the shoulder belt attaching members in a manner spaced apart from each other along the width direction of the first backing member.

3. The safety belt according to claim 2, further comprising a tabular second backing member attached to a back of the passenger, wherein
 the second waist belt is coupled to a lower part of the second backing member and
 the second shoulder belts are coupled to an upper part of the second backing member.

4. The safety belt according to claim 2, further comprising a backing belt fixed to a back face of the first backing member and running along a vertical direction of the first backing member, wherein
 the plurality of waist belt attaching portions are provided on the backing belt spaced apart in the vertical direction each passing through in a width direction of the backing belt, and the plurality of shoulder belt attaching members are provided on the backing belt spaced apart in the vertical direction each passing through in a vertical direction of the backing belt.

5. The safety belt according to claim 2, wherein
the backing belt includes a plurality of portions stitched to the first backing member in the width direction and spaced apart in the vertical direction,
the shoulder belt attaching member comprises an annular member inserted and fastened in the width direction of the backing belt at an annular portion located at a space between the adjoining stitched portions of the backing belt in the vertical direction, and
the waist belt attaching portion comprises an annular portion in the width direction of the backing belt located between the adjoining shoulder belt attaching members spaced apart from one another in the vertical direction and between the stitched portions spaced apart in the vertical direction.

6. The safety belt according to claim 2, further comprising a pull member which has one end coupled to the second shoulder belt, has another end running toward a front side of the driver along the first shoulder belt, and has a predetermined length,
wherein the second shoulder belt can be pulled by pulling the other end of the pull member toward the front side of the driver.

7. The safety belt according to claim 1, wherein
the second waist belt includes front portions located at a driver side detachably inserted in a width direction of the first backing member in any of the plurality of waist belt attaching portions or caught by the waist belt attaching portions in a manner spaced apart from each other at a predetermined clearance in the width direction of the first backing member,
the plurality of shoulder belt attaching members are provided above the plurality of waist belt attaching portions, and
the pair of second shoulder belts are coupled together to form a loop around shoulders of the passenger to a front of a chest of the passenger and have a portion frontward of a coupled portion and at a driver side which is detachably attached to any of the plurality of shoulder belt attaching members.

8. The safety belt according to claim 7, further comprising a tabular second backing member attached to a back of the passenger, wherein
the second waist belt is coupled to a lower part of the second backing member and
the second shoulder belts are coupled to an upper part of the second backing member.

9. The safety belt according to claims 7, further comprising a backing belt fixed to a back face of the first backing member and running along a vertical direction of the first backing member, wherein
the plurality of waist belt attaching portions are provided on the backing belt spaced apart in the vertical direction each passing through in a width direction of the backing belt, and
the plurality of shoulder belt attaching members are provided on the backing belt spaced apart in the vertical direction each passing through in a vertical direction of the backing belt.

10. The safety belt according to claim 7, wherein
the backing belt includes a plurality of portions stitched to the first backing member in the width direction and spaced apart in the vertical direction,
the shoulder belt attaching member comprises an annular member inserted and fastened in the width direction of the backing belt at an annular portion located at a space between the adjoining stitched portions of the backing belt in the vertical direction, and
the waist belt attaching portion comprises an annular portion in the width direction of the backing belt located between the adjoining shoulder belt attaching members spaced apart from one another in the vertical direction and between the stitched portions spaced apart in the vertical direction.

11. The safety belt according to claim 7, further comprising a pull member which has one end coupled to the second shoulder belt, has another end running toward a front side of the driver along the first shoulder belt, and has a predetermined length,
wherein the second shoulder belt can be pulled by pulling the other end of the pull member toward the front side of the driver.

12. The safety belt according to claim 1, further comprising a pull member which has one end coupled to the second shoulder belt, has another end running toward a front side of the driver along the first shoulder belt, and has a predetermined length,
wherein the second shoulder belt can be pulled by pulling the other end of the pull member toward the front side of the driver.

13. A safety belt for coupling respective upper body parts of a driver of a two-wheeled vehicle and a passenger thereof, comprising:
a first backing member attached to a back of the driver;
a first waist belt coupled to a lower part of the first backing member and attached around a waist of the driver;
a pair of first shoulder belts coupled to an upper part of the first backing member and attached around shoulders of the driver;
a second backing member attached to a back of the passenger;
a second waist belt coupled to a lower part of the second backing member, attached around a waist of the passenger, and having front portions located at a driver side inserted in a width direction of the first backing member in a waist belt attaching portion provided on the first backing member or caught by the waist belt attaching portion in a manner spaced apart from each other at a predetermined clearance in the width direction of the first backing member; and
a second shoulder belt coupled to an upper part of the second backing member, attached around shoulders of the passenger and having a front portion located at the driver side attached to a shoulder belt attaching member provided on the first backing member at a location above the position of the waist belt attaching portion.

* * * * *